US011466775B2

(12) United States Patent
Herse et al.

(10) Patent No.: US 11,466,775 B2
(45) Date of Patent: Oct. 11, 2022

(54) BELT-DRIVEN ROTATING SENSOR PLATFORM FOR AUTONOMOUS VEHICLES

(71) Applicant: GM Cruise Holdings LLC, San Francisco, CA (US)

(72) Inventors: Nathaniel Barrett Herse, San Francisco, CA (US); Joel F. Jensen, Redwood City, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 300 days.

(21) Appl. No.: 16/793,562

(22) Filed: Feb. 18, 2020

(65) Prior Publication Data

US 2021/0254709 A1 Aug. 19, 2021

(51) Int. Cl.
| | |
|---|---|
| *F16H 61/02* | (2006.01) |
| *G05D 1/02* | (2020.01) |
| *F16H 55/36* | (2006.01) |
| *G01S 17/931* | (2020.01) |

(52) U.S. Cl.
CPC ....... *F16H 61/0251* (2013.01); *G05D 1/0231* (2013.01); *F16H 2055/363* (2013.01); *G01S 17/931* (2020.01)

(58) Field of Classification Search
CPC .......... F16H 61/0251; F16H 2055/363; G05D 1/0231; G01S 17/931; G01S 7/4813; G01S 7/4817; G01S 7/4972
See application file for complete search history.

(56) References Cited

U.S. PATENT DOCUMENTS

| | | | | |
|---|---|---|---|---|
| 10,830,322 B1 * | 11/2020 | Sasso | ..................... | G01S 7/4817 |
| 2014/0049784 A1 * | 2/2014 | Woloschyn | ............ | G01B 11/02 356/625 |
| 2015/0057117 A1 * | 2/2015 | Antchak | ............... | F16H 7/1263 474/109 |
| 2018/0272998 A1 * | 9/2018 | Schmidt | ................ | B05B 7/2424 |

FOREIGN PATENT DOCUMENTS

| | | | |
|---|---|---|---|
| AT | 507872 A1 * | 8/2010 | ............ G01S 17/42 |
| KR | 101449931 B1 * | 10/2014 | |

\* cited by examiner

*Primary Examiner* — Aniss Chad
*Assistant Examiner* — Christopher George Fees
(74) *Attorney, Agent, or Firm* — Polsinelli, PC

(57) ABSTRACT

Technologies for steering sensors in a sensor carrier structure on an autonomous vehicle (AV) are described herein. In some examples, a sensor positioning platform on an AV can include an actuator system including a motor; a belt mechanically engaged to a set of pulleys such that operation of the motor results in the belt driving a first rotational movement of at least one of the pulleys, which, in turn, causes a second rotational movement of a sensor carrier structure; a motor controller that receives instructions for controlling the motor to reposition the sensor carrier structure and sending control signals to the motor to perform the repositioning of the sensor carrier structure; and a bundle of cables coiled within a central bore of the actuator system.

20 Claims, 11 Drawing Sheets

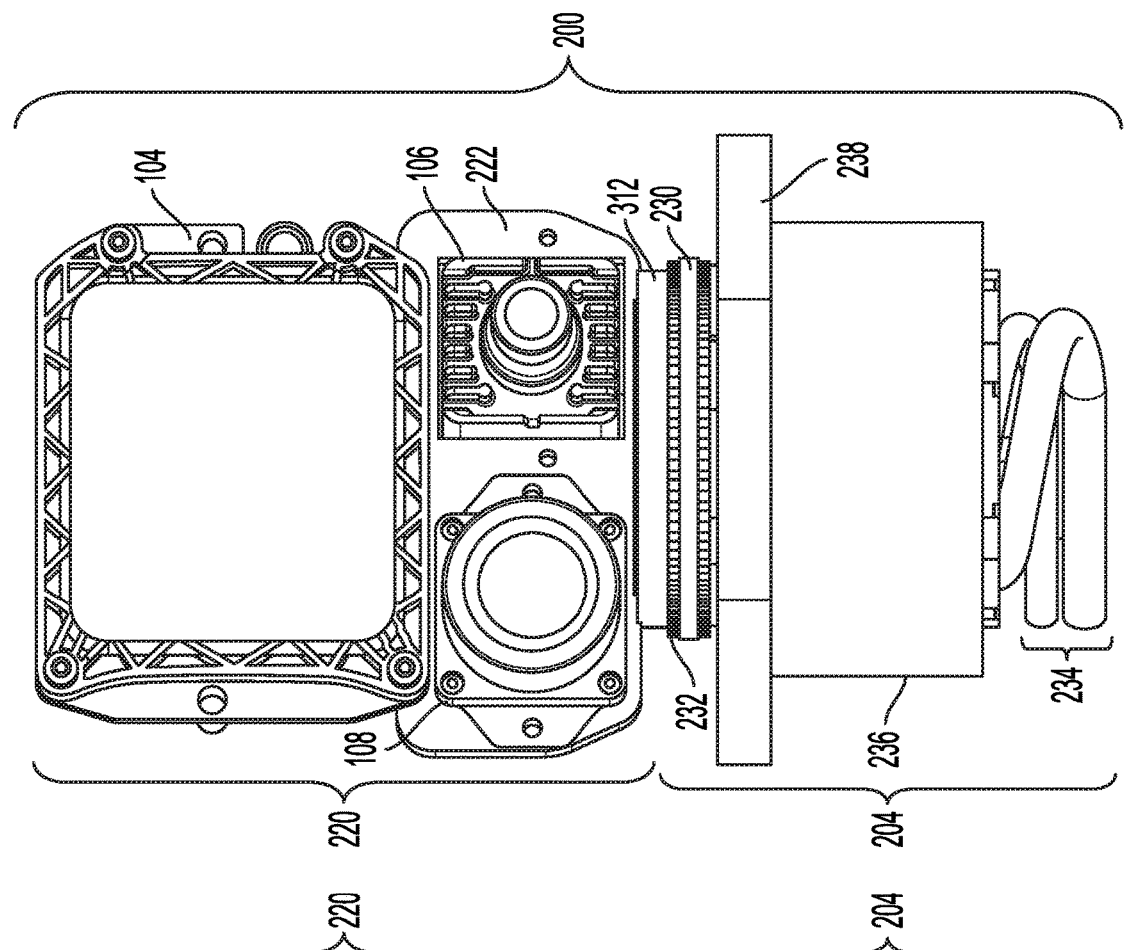
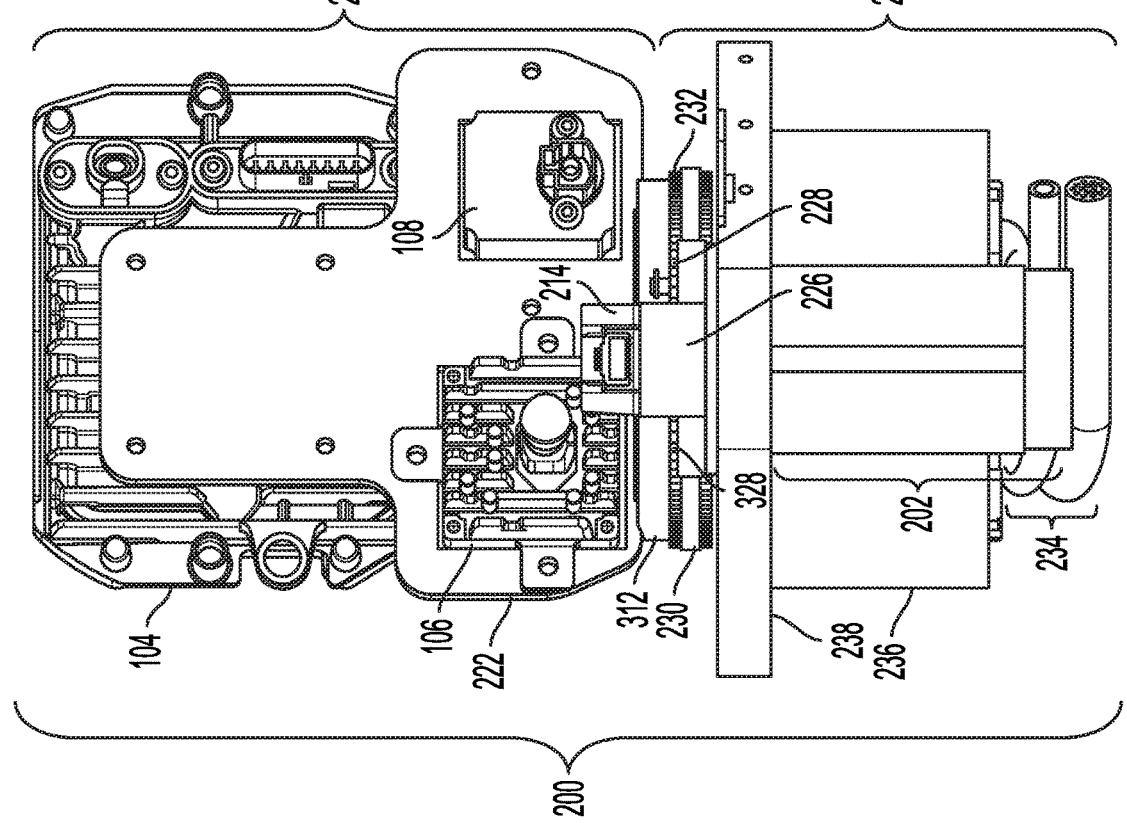
FIG. 4B
FIG. 4A

BELT-DRIVEN ROTATING SENSOR PLATFORM FOR AUTONOMOUS VEHICLES

TECHNICAL FIELD

The present disclosure generally relates to sensor implementations for autonomous vehicles.

BACKGROUND

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

The field of view and coverage of sensors can depend on their capabilities and placement (e.g., location, angle, etc.). In the context of autonomous vehicles, the field of view and coverage of sensors can also be significantly impacted by changes in motion, driving angles and direction, as well as changes in their environment, including relative changes in the motion, angle, and position of surrounding objects. For example, as an autonomous vehicle travels and performs various driving maneuvers, the position and perspective of the sensors relative to the vehicle's surroundings also change. The changes in the relative position and perspective of the sensors can create blind spots and reduce their field of coverage, thereby limiting what the sensors can "see" or detect. However, autonomous vehicles need to have a robust understanding of their environment to safely operate, and because they largely rely on sensors to navigate and understand their environment, a sensor blind spot or reduced field of coverage can create significant risks to human lives and property.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 4A illustrates a rear view of an example configuration of a sensor positioning platform, in accordance with some examples;

FIG. 4B illustrates a front view of an example configuration of a sensor positioning platform, in accordance with some examples;

DETAILED DESCRIPTION

Figure 1:
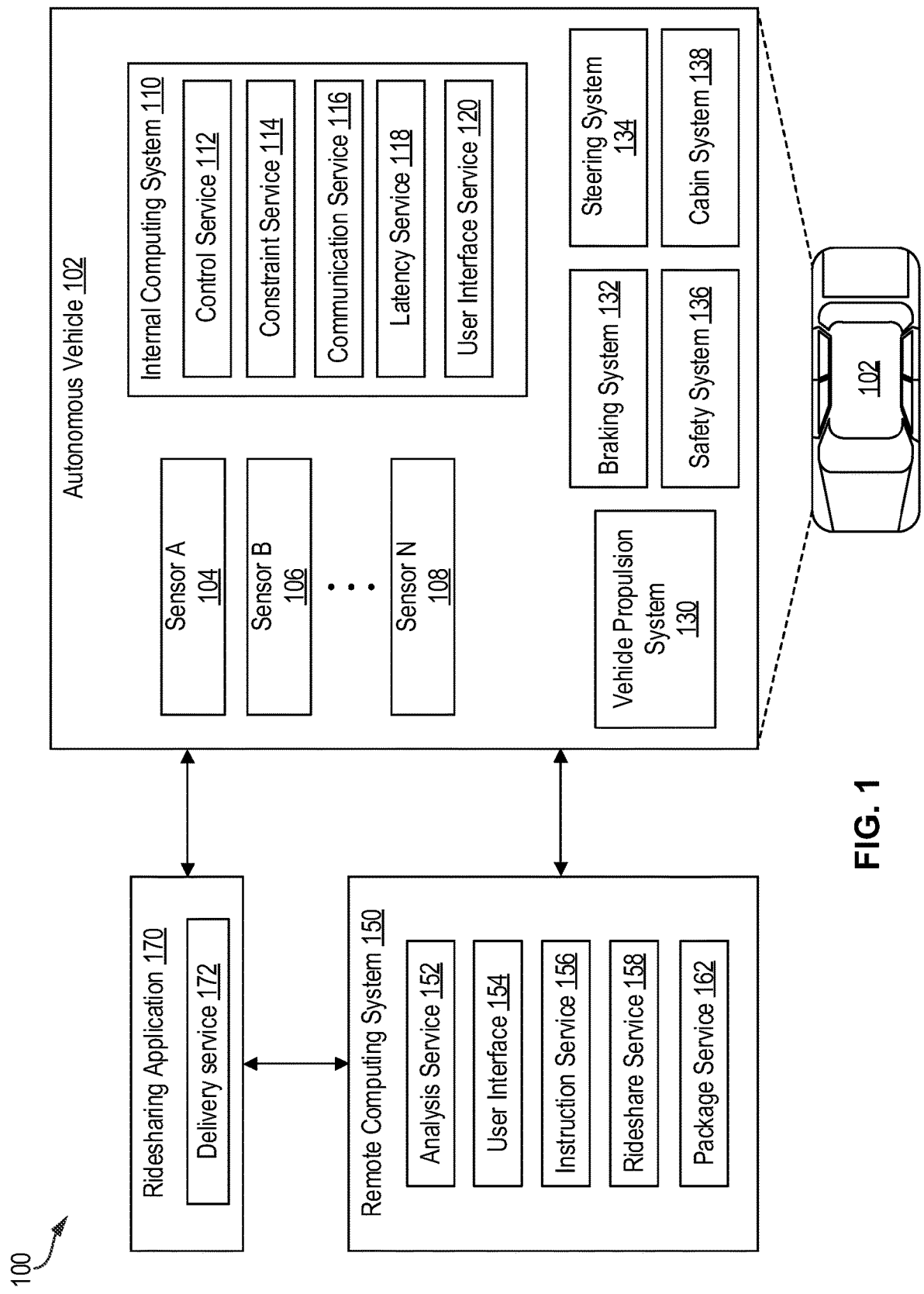
FIG. 1 illustrates an example autonomous vehicle environment including a computing system in communication with an autonomous vehicle.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

The disclosed technologies address a need in the art for improvements in vehicle sensor technologies and capabilities. In some examples, a sensor positioning platform on an autonomous vehicle can include multiple co-located sensors that can be dynamically rotated or repositioned for optimal sensor coverage. The sensors can be mounted on a rotating sensor carrier structure of the sensor positioning platform, which functions as an azimuth positioning stage for the sensors. The sensor carrier structure can be mounted on to a timing pulley drive ring that may be mechanically engaged, via a belt, with one or more pulleys such that, in response to movement of the belt, the timing pulley drive ring and, hence, the sensor carrier structure, rotate. The sensor positioning platform can include a motor for driving, via the one or more pulleys, the belt for the moving, repositioning, and/or rotating of the sensors and sensor carrier structure, and electrical components for controlling the movement, repositioning, and/or rotation of the sensors and sensor carrier structure through the motor and belt. The sensor positioning platform can also include a helical service loop integrated into the bore of the timing pulley drive ring and including a set of cables and tubes that interconnects the sensors with other electrical components of the autonomous vehicle and provides a freedom of movement that enables the sensors to remain connected when rotating, and other components as described herein.

The sensor positioning platform can receive (e.g., from a computing system on the autonomous vehicle) commands for moving, repositioning, and/or rotating the sensors and sensor carrier structure. Thus, through the sensor positioning platform, the sensors can be repositioned to increase sensor coverage, provide instantaneous field of view, and target specific areas or objects. Further, because the sensor positioning platform integrates one or more pulleys and a timing pulley drive ring, each of which are driven using a belt, the resolution and accuracy of the sensor positioning platform can be improved via definition of different gear ratios. Additional benefits of using a belt-driven system may include the reduction or elimination of cogging torque, a reduction in the mass of the motor required to drive the sensor positioning platform, and lower cost to implement. The sensors can also be repositioned to account for changes in the vehicle's motion, driving angles and direction, as well as relative changes in the vehicle's environment and the motion, angle, and position of surrounding objects. The dynamic and adaptable sensor repositioning herein can improve the sensors' visibility, accuracy, and detection capabilities. The sensor repositioning platform can allow autonomous vehicles to monitor their surroundings and obtain a robust understanding of their environment. The sensor repositioning platform and associated functionality can also provide benefits in cost, sensor data redundancy, and sensor fusion.

FIG. 1 illustrates an example autonomous vehicle environment 100. The example autonomous vehicle environment 100 includes an autonomous vehicle 102, a remote computing system 150, and a ridesharing application 170. The autonomous vehicle 102, remote computing system 150, and ridesharing application 170 can communicate with each other over one or more networks, such as a public network (e.g., a public cloud, the Internet, etc.), a private network (e.g., a local area network, a private cloud, a virtual private network, etc.), and/or a hybrid network (e.g., a multi-cloud or hybrid cloud network, etc.).

The autonomous vehicle 102 can navigate about roadways without a human driver based on sensor signals generated by sensors 104-108 on the autonomous vehicle 102. The sensors 104-108 on the autonomous vehicle 102 can include one or more types of sensors and can be arranged about the autonomous vehicle 102. For example, the sensors 104-108 can include, without limitation, one or more inertial measuring units (IMUs), one or more image sensors (e.g., visible light image sensors, infrared image sensors, video camera sensors, surround view camera sensors, etc.), one or more light emitting sensors, one or more global positioning system (GPS) devices, one or more radars, one or more light detection and ranging sensors (LIDARs), one or more sonars, one or more accelerometers, one or more gyroscopes, one or more magnetometers, one or more altimeters, one or more tilt sensors, one or more motion detection sensors, one or more light sensors, one or more audio sensors, etc. In some implementations, sensor 104 can be a radar, sensor 106 can be a first image sensor (e.g., a visible light camera), and sensor 108 can be a second image sensor (e.g., a thermal camera). Other implementations can include any other number and type of sensors.

The autonomous vehicle 102 can include several mechanical systems that are used to effectuate motion of the autonomous vehicle 102. For instance, the mechanical systems can include, but are not limited to, a vehicle propulsion system 130, a braking system 132, and a steering system 134. The vehicle propulsion system 130 can include an electric motor, an internal combustion engine, or both. The braking system 132 can include an engine brake, brake pads, actuators, and/or any other suitable componentry configured to assist in decelerating the autonomous vehicle 102. The steering system 134 includes suitable componentry configured to control the direction of movement of the autonomous vehicle 102 during navigation.

The autonomous vehicle 102 can include a safety system 136. The safety system 136 can include lights and signal indicators, a parking brake, airbags, etc. The autonomous vehicle 102 can also include a cabin system 138, which can include cabin temperature control systems, in-cabin entertainment systems, etc.

The autonomous vehicle 102 can include an internal computing system 110 in communication with the sensors 104-108 and the systems 130, 132, 134, 136, and 138. The internal computing system 110 includes one or more processors and at least one memory for storing instructions executable by the one or more processors. The computer-executable instructions can make up one or more services for controlling the autonomous vehicle 102, communicating with remote computing system 150, receiving inputs from passengers or human co-pilots, logging metrics regarding data collected by sensors 104-108 and human co-pilots, etc.

The internal computing system 110 can include a control service 112 configured to control operation of the vehicle propulsion system 130, the braking system 132, the steering system 134, the safety system 136, and the cabin system 138. The control service 112 can receive sensor signals from the sensors 104-108 can communicate with other services of the internal computing system 110 to effectuate operation of the autonomous vehicle 102. In some examples, control service 112 may carry out operations in concert with one or more other systems of autonomous vehicle 102.

The internal computing system 110 can also include a constraint service 114 to facilitate safe propulsion of the autonomous vehicle 102. The constraint service 116 includes instructions for activating a constraint based on a rule-based restriction upon operation of the autonomous vehicle 102. For example, the constraint may be a restriction on navigation that is activated in accordance with protocols configured to avoid occupying the same space as other objects, abide by traffic laws, circumvent avoidance areas, etc. In some examples, the constraint service 114 can be part of the control service 112.

The internal computing system 110 can also include a communication service 116. The communication service 116 can include software and/or hardware elements for transmitting and receiving signals to and from the remote computing system 150. The communication service 116 can be configured to transmit information wirelessly over a network, for example, through an antenna array or interface that provides cellular (long-term evolution (LTE), $3^{rd}$ Generation (3G), $5^{th}$ Generation (5G), etc.) communication.

In some examples, one or more services of the internal computing system 110 are configured to send and receive communications to remote computing system 150 for reporting data for training and evaluating machine learning algorithms, requesting assistance from remote computing system 150 or a human operator via remote computing system 150, software service updates, ridesharing pickup and drop off instructions, etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150, as information can quickly become too stale to be actionable. When the latency service 118 determines that a response has not been received within a threshold period of time, the latency service 118 can enable other systems of autonomous vehicle 102 or a passenger to make decisions or provide needed feedback.

The internal computing system 110 can also include a user interface service 120 that can communicate with cabin system 138 to provide information or receive information to a human co-pilot or passenger. In some examples, a human co-pilot or passenger can be asked or requested to evaluate and override a constraint from constraint service 114. In other examples, the human co-pilot or passenger may wish to provide an instruction to the autonomous vehicle 102 regarding destinations, requested routes, or other requested operations.

As described above, the remote computing system 150 can be configured to send and receive signals to and from the autonomous vehicle 102. The signals can include, for example and without limitation, data reported for training and evaluating services such as machine learning services, data for requesting assistance from remote computing system 150 or a human operator, software service updates, rideshare pickup and drop off instructions, etc.

The remote computing system 150 can include an analysis service 152 configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, images, sounds reported from the autonomous vehicle 102 to an operator of remote computing system 150, maps, routes, navigation data, notifications, user data, vehicle data, software data, and/or any other content. User interface service 154 can receive, from an operator, input instructions for the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 operating on computing devices, such as tablet computers, laptop computers, smartphones, head-mounted displays (HMDs), gaming systems, servers, smart devices, smart wearables, and/or any other computing devices. In some cases, such computing devices can be passenger computing devices. The rideshare service 158 can receive from passenger ridesharing app 170 requests, such as user requests to be picked up or dropped off, and can dispatch autonomous vehicle 102 for a requested trip.

The rideshare service 158 can also act as an intermediary between the ridesharing app 170 and the autonomous vehicle 102. For example, rideshare service 158 can receive from a passenger instructions for the autonomous vehicle 102, such as instructions to go around an obstacle, change routes, honk the horn, etc. The rideshare service 158 can provide such instructions to the autonomous vehicle 102 as requested.

The remote computing system 150 can also include a package service 162 configured to interact with the ridesharing application 170 and/or a delivery service 172 of the ridesharing application 170. A user operating ridesharing application 170 can interact with the delivery service 172 to specify information regarding a package to be delivered using the autonomous vehicle 102. The specified information can include, for example and without limitation, package dimensions, a package weight, a destination address, delivery instructions (e.g., a delivery time, a delivery note, a delivery constraint, etc.), and so forth.

The package service 162 can interact with the delivery service 172 to provide a package identifier to the user for package labeling and tracking. Package delivery service 172 can also inform a user of where to bring their labeled package for drop off. In some examples, a user can request the autonomous vehicle 102 come to a specific location, such as the user's location, to pick up the package. While delivery service 172 has been shown as part of the ridesharing application 170, it will be appreciated by those of ordinary skill in the art that delivery service 172 can be its own separate application.

One beneficial aspect of utilizing autonomous vehicle 102 for both ridesharing and package delivery is increased utilization of the autonomous vehicle 102. Instruction service 156 can continuously keep the autonomous vehicle 102 engaged in a productive itinerary between rideshare trips by filling what otherwise would have been idle time with productive package delivery trips.

Figure 2:
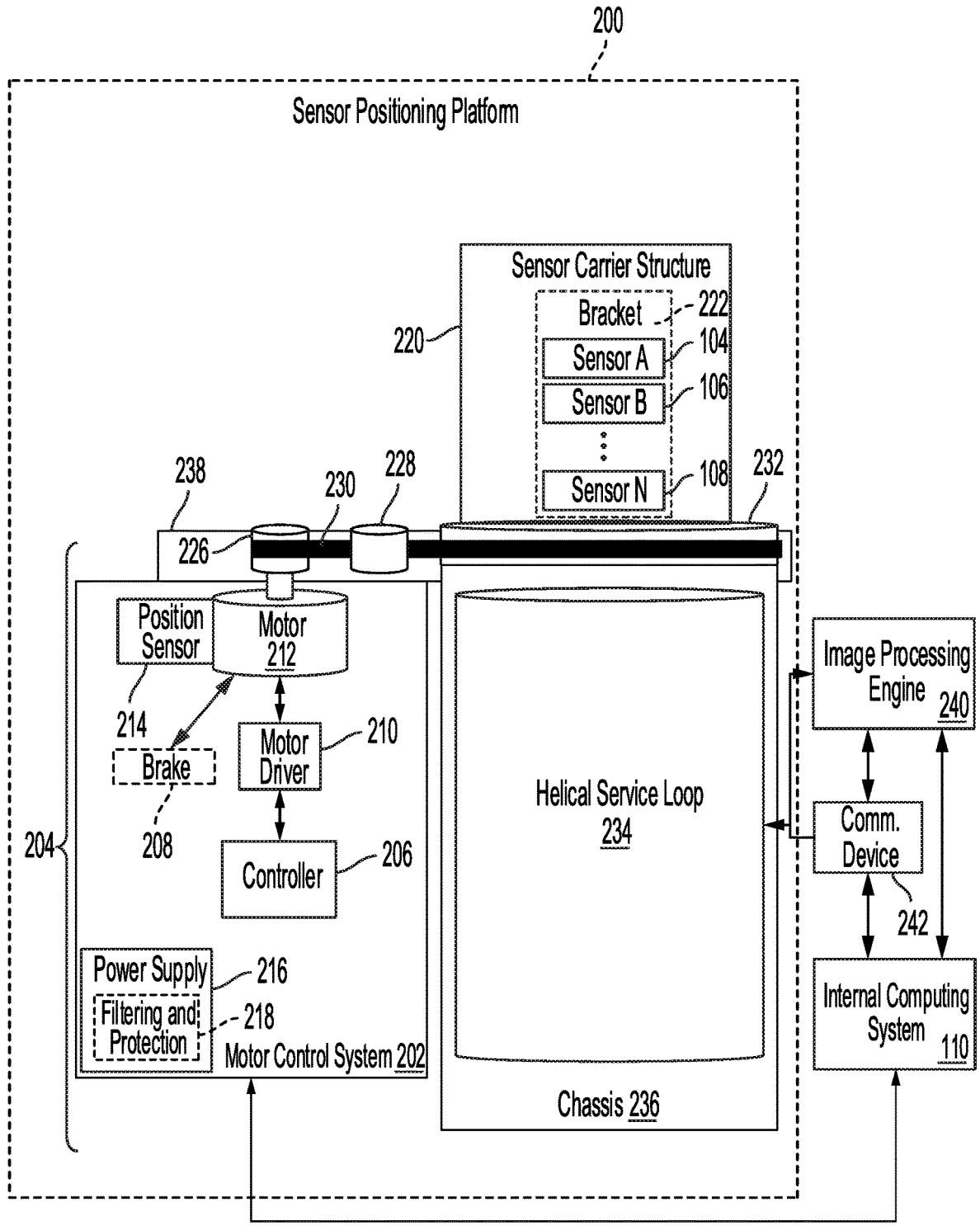
FIG. 2 is a block diagram of an example sensor positioning platform for mechanically moving, rotating, and/or positioning a payload of sensors on an autonomous vehicle, in accordance with some examples.

FIG. 2 is a block diagram of an example sensor positioning platform 200 for mechanically moving, rotating, and/or positioning sensors 104-108 on a sensor carrier structure 220 implemented by the autonomous vehicle 102. The sensor positioning platform 200 can be attached to, coupled with, and/or otherwise secured to the autonomous vehicle 102. The sensor carrier structure 220 with the sensors 104-108 can be situated outside of the autonomous vehicle 102 in order to have access to, and/or visibility into, the external or outside environment (e.g., outside or external to the autonomous vehicle 102) so the sensors 104-108 can capture sensor data or measurements pertaining to the outside environment, conditions or characteristics of the outside environment, objects or humans located in the outside environment, etc.

In addition to providing the sensors 104-108 access to, and/or visibility into, the external or outside environment, as further described herein, the sensor positioning platform 200 can mechanically move, rotate, and/or reposition the sensor carrier structure 220 to allow the sensors 104-108 on the sensor carrier structure 220 to capture sensor data or measurements for different areas or regions of the outside environment, extend the addressable field of regard, extend and/or provide an instantaneous field of view, provide sensor visibility or access into a focused or specific area or object, account for different angles, account for different vehicle maneuvers, etc. The sensor data or measurements can be used to detect objects (e.g., other vehicles, obstacles, traffic signals, signs, etc.), humans, animals, conditions (e.g., weather conditions, visibility conditions, traffic conditions, road conditions, etc.), route or navigation conditions, and/or any other data or characteristics associated with the outside environment.

In some examples, the autonomous vehicle 102 can use the sensor data or measurements to perform (or when performing) one or more operations, such as mapping operations, tracking operations, navigation or steering operations, safety operations, braking operations, maneuvers, etc. For example, the autonomous vehicle 102 can use the sensor data or measurements to gain insight or visibility into the outside environment and the outside environment conditions. The autonomous vehicle 102 can then use such insight when making navigation decisions, such as determining a velocity, determining a maneuver, determining how to avoid an object, determining a trajectory, determining navigation changes (e.g., changes in position, velocity, angle, direction, etc.), and so forth.

The sensor positioning platform 200 can include a chassis 236 coupled to a platform 238. The chassis 236 can include an actuator system 204 comprising a motor control system 202, a motor belt drive pulley 226, and a tension arm pulley 228 that, collectively, may be used to drive a belt 230 around the circumference of a timing pulley drive ring 232. If the motor control system 202, via controller 206 instructions to a motor driver 210 and the motor 212, engages the motor belt drive pulley 226, resulting in rotation of the motor belt drive pulley 226, the belt 230 may cause a rotational movement of the timing pulley drive ring 232. In some examples, the sensor carrier structure 220 is mounted onto an upper surface of the timing pulley drive ring 232. Thus, as a result of the rotational movement of the timing pulley drive ring 232, the sensor carrier structure 220 may also rotate.

In some examples, the motor 212 includes a planetary gearhead, which may be configured to more finely tune the rotational movement of the motor belt drive pulley 226 and, hence, the timing belt 230. For instance, the planetary gearhead may reduce the number of rotations of the motor belt drive pulley 226 resulting from the operation of the motor 212. This may allow for more precise movement of the motor belt drive pulley 226 and the timing belt 230, which may translate to greater resolution in the movement of the timing pulley drive ring 232. It should be noted that while a planetary gearhead is used extensively throughout the present disclosure for the purpose of illustration, other mechanisms for accomplishing gear reduction within the actuator system 204 may be used. For instance, orbitless gearheads may be used in place of a planetary gearhead.

In some examples, the tension arm pulley 228 maintains tension on the timing belt 230 during operation of the motor 212, whereby the timing belt 230 may drive the rotational movement of the timing pulley drive ring 232. As described in greater detail below, the tension arm pulley 228 may include a tension arm mechanically engaged to a spring mechanism that pushes the tension arm into the timing belt 230 to generate belt tension. This may reduce or otherwise eliminate the backlash of the timing belt 230 during operation of the motor 212.

In some examples, the timing pulley drive ring 232 includes a hollow chamber, or bore, through its center, extending from an upper surface of the platform 238 to the bottom base of the chassis 236. Within this bore of the timing pulley drive ring 232, the sensor positioning system 200 may include a helical service loop 234. The helical service loop 234, in an example, includes one or more cables and tubes that can feed power and communication lines to the sensors 104-108 for powering the sensors 104-108 and communicatively connecting (directly or indirectly) the sensors 104-108 to the internal computing system 110 and/or the actuator system 204, while allowing the sensors 104-108 to have freedom of movement in order to rotate with the sensor carrier structure 220 while receiving power and remaining communicatively connected to the internal computing system 110 and/or the actuator system 204.

In some cases, the helical service loop 234 can include data lines that connect the sensors 104-108 to a communications device 242 and/or an image processing engine 240. The data lines can allow the sensors 104-108 to communicate with the communications device 242 to send and receive data signals (e.g., sensor data, instructions, commands, information, etc.) to and from the communications device 242. Moreover, the data lines can allow image sensors (106, 108) on the sensor carrier structure 220 to provide, to the image processing engine 240, image data (e.g., images, videos, frames, etc.) captured by such image sensors.

It should be noted that while a helical service loop 234 is used throughout the present disclosure for the purpose of illustration, the various cables and tubes that are used to form the helical service loop 234 can be organized within the bore of the timing pulley drive ring 232 in alternative configurations. For instance, the cables and tubes can be organized using slip rings, optical couplers, a clock spring flex circuit spiral, and the like.

The communications device 242 can include, for example and without limitation, a network interface, a switch, a hub, a relay/proxy, or any other network device capable of switching, forwarding, and/or routing data. In some implementations, the communications device 242 can support network communications over or across one or more networks, such as a private network (e.g., a LAN), a public network (e.g., a WAN, a cloud network, etc.), a hybrid network, etc. For example, the communications device 242 can support wireless communications, such as cellular communications, WIFI communications, etc.; wired or cable communications, such as Ethernet communications, fiber optic communications, etc.; and/or any other type of communications.

The communications device 242 can be communicatively connected with the internal computing system 110 and/or any other computing device, and can thus send and/or receive data to and/or from the internal computing system 110 and/or any other computing devices. Thus, the communications device 242 can route or forward data between the sensors 104-108 and the internal computing system 110 (or any other computing device). Moreover, in some cases, the communications device 242 can be part of, or implemented by, the internal computing system 110.

The image processing engine 240 can be part of, or implemented by, the internal computing system 110 or a separate computing device. Moreover, in some cases, the image processing engine 240 can be part of, or implemented by, a same computing system as the communications device 242. For example, both the image processing engine 240 and the communications device 242 can be part of, or implemented by, the internal computing system 110 or a separate computing device.

The image processing engine 240 can receive image data (e.g., images, frames, videos, etc.) from image sensors (e.g., 106, 108) on the sensor carrier structure 220 and perform one or more image processing and/or pre-processing operations on the image data, such as, for example and without limitation, filtering, scaling, sub-sampling, color correction, color conversion, geometric transformations, noise reduction, demosaicing, spatial filtering, image restoration, image enhancement, frame rate conversion (e.g., up-conversion, down-conversion), segmentation, feature extraction, etc. The image processing engine 240 can then provide the processed image data to the internal computing system 110 for further use, processing, analysis, etc.

The actuator system 204 can be configured to control a position, angle, and/or movement of the sensor carrier structure 220 and the sensors 104-108 on the sensor carrier structure 220. For example, the actuator system 204 can include, within the motor control system 202, a motor 212 for controlling the positioning, rotation, and/or movement of the sensor carrier structure 220 hosting the sensors 104-108, as further described herein. Further, the motor control system 202 may include a motor controller 206, which can provide instructions or commands to the motor 212, via a motor driver 210, to perform a set of operations. For instance, the motor 212 on the actuator system 204 can receive, from the motor controller 206, a command instructing the motor 212 to move or rotate a motor belt drive pulley 226 in order to drive a timing belt 230 around the circumference of the timing pulley drive ring 232. The driving of the timing belt 230 resulting from the rotational movement of the motor belt drive pulley 226 may generate a second rotational movement of the timing pulley drive ring 232. The sensor carrier structure 220 may, thus, rotate in conjunction with the timing pulley drive ring 232. The motor controller 206 may determine the rotational movement of the motor belt drive pulley 226 required to move the sensor carrier structure 220 with the sensors 104-108 to a specific angle and/or position in order to change the angle, position, and/or field-of-view (FOV) of the sensors 104-108 on the sensor carrier structure 220. For instance, based on a belt drive ratio (e.g., gear ratio) between the motor belt drive pulley 226 and the timing pulley drive ring 232, the motor controller 206 may determine the amount of rotational movement of the motor belt drive pulley 226 required to rotate the timing pulley drive ring 232 and, hence, the sensor carrier structure 220 to a particular angle, position, and/or FOV of the sensors 104-108.

In some examples, the motor 212 can be an electrical motor capable of converting electrical energy into mechanical energy that the motor 212 can use to move the motor belt drive pulley 226, resulting in movement of the timing pulley drive ring 232, the sensor carrier structure 220 and the sensors 104-108 in the sensor carrier structure 220. In some implementations, the motor 212 can be an electric motor, a pneumatic motor, a hydraulic motor, an internal combustion motor, and the like. Moreover, the motor controller 206 can include one or more electronic circuits (e.g., one or more microprocessors, microcontrollers, central processing units (CPUs), graphics processing units (GPUs), digital signal processors (DSPs), and/or any other suitable electronic circuits or hardware), and/or can include and/or can be implemented using computer software, firmware, or any combination thereof, to perform the various operations described herein. In some cases, the motor controller 206, which can parse the commands or instructions from the internal computing system 110 and/or the communications device 242, can generate one or more control signals based on the commands or instructions, and send the one or more control signals to a motor driver 210 on the motor control system 202, which can use (the motor driver 210) the one or more control signals to move the motor 212 (and the sensor carrier structure 220 of sensors 104-108 via rotational movement of the motor belt drive pulley 226 and the timing pulley drive ring 232) to a specified position, angle, and/or location.

In some examples, the motor controller 206 can include one or more computing and/or electronic components, such as one or more CPUs, Input/Output (I/O) ports or peripherals, timers, memories (e.g., electrically erasable programmable read-only memory (EEPROM), read-only memory (ROM), random-access memory, and the like), controllers, processors, storage devices, and/or any other electronic circuits or hardware. Moreover, the motor controller 206 can include memory (not shown), such as EEPROM, for storing data, firmware, software, and/or any combination thereof.

As noted above, the motor controller 206 can send control signals to the motor driver 210 to move, rotate, and/or control the motor 212, which can then rotate the motor belt drive pulley 226 to drive the belt 230 and cause rotational movement of the timing pulley drive ring 232. This, in turn, results in the movement, rotation, and/or positioning of the sensor carrier structure 220 with the sensors 104-108 to a specific position, angle, and/or location. In some cases, the motor controller 206 can generate the control signals based on, and/or in response to, one or more commands or instructions received by the motor controller 206 from the internal computing system 110 on the autonomous vehicle 102. For example, the internal computing system 110 can send commands or instructions to the motor controller 206 for mechanically moving, rotating, and/or positioning the sensor carrier structure 220 with the sensors 104-108 and/or the motor 212 on the sensor positioning platform 200. The motor controller 206 can receive such commands or instructions, parse the commands or instructions, generate one or more control signals based on the commands or instructions, and send the one or more control signals to the motor driver 210 on the actuator system 204, which can cause the motor 212 to rotate the motor belt drive pulley 226 in order to drive a belt 230 for rotating the timing pulley drive ring 232 and, hence, the sensor carrier structure 220 with the sensors 104-108 to a specific position, angle, and/or location.

In some cases, when generating control signals, the motor controller 206 can calculate a difference between a requested position (e.g., specified in the commands or instructions received from the internal computing system 110) of the motor 212 (and the sensor carrier structure 220 with the sensors 104-108) and an actual or current position of the motor 212 (and the sensor carrier structure 220 with the sensors 104-108). For example, the motor controller 206 can obtain sensor data from a position sensor 214 in the actuator system 204, which can include measurements of a current or actual position of the motor 212, and use such measurements to determine a current or actual position of the motor 212. The motor controller 206 can use the current or actual position of the motor 212 to calculate an error or difference between the current or actual position of the motor 212 and the requested position for repositioning the motor 212 (and the sensor carrier structure 220 with the sensors 104-108). In some examples, the controller 206 calculates, based on the requested position for the sensor carrier structure 220, the current or actual position of the motor 212, and the belt drive ratio between the motor belt drive pulley 226 and the timing pulley drive ring 232, the movement of the motor 212 required to achieve the requested position for the sensor carrier structure 220 with the sensors 104-108.

The motor controller 206 can use the calculated error or difference to make any adjustments to the position defined in the one or more control signals for the motor 212. In some cases, the motor controller 206 can continuously receive position measurements from the position sensor 214 to calculate such errors or differences, and make adjustments to the position specified in the control signals to the motor driver 210 and the motor 212. This way, the motor controller 206 can fine tune the position specified in the control signals to the motor 212 to account for any such errors and increase an accuracy of the position adjustments of the motor 212 (and the sensor carrier structure 220 of sensors 104-108).

The position sensor 214 used to obtain position measurements for the motor 212 can include one or more sensor devices, which can include any type of sensor, encoder, transducer, detector, transmitter, and/or sensing component capable of measuring the position (e.g., linear, angular, etc.) and/or change of position of a target or object, such as the motor 212. Non-limiting examples of position sensors (214) that can be used to obtain position measurements (e.g., displacement, linear position, angular position, etc.) for the motor 212 include optical encoders, potentiometers, magnetic position sensors (e.g., Hall effect sensors, magnetorestrictive position sensors, etc.), rotary encoders, linear encoders, capacitive position sensors, inductive position sensors (e.g., resolvers, linearly variable differential transformers, etc.), fiber-optic position sensors, photodiode arrays, incoders, etc. These examples are not exhaustive and are simply provided for explanation purposes, as any other types of position sensors are also contemplated herein.

The position sensor 214 can be installed on the motor shaft of the motor 212, between a planetary gearhead of the motor 212 and the motor belt drive pulley 226, along an outside of a rotor of the motor 212, along an outside of a stator of the motor 212, and/or in any other location that allows the position sensor 214 to obtain positioning measurements for the motor 212 and fit within the actuator system 204. For example, in some implementations, the position sensor 214 can determine the position of the motor 212 using a multi-pole magnetic strip. The multi-pole magnetic strip can be located on an outside of the motor 212, a rotor of the motor 212, a stator of the motor 212, and/or any other location that allows the multi-pole magnetic strip to determine the position of the motor 212. In some cases, the multi-pole magnetic strip can sit flush along the outside of the rotor of the motor 212. In some examples, the position sensor 214 can be integrated on to the shaft of the motor 212. The position sensor 214 may be enclosed within the motor control system 202 to protect the position sensor 214 from dust, moisture, or any other adverse conditions that may impact performance of the position sensor 214. Additionally, this enclosure may be heated, as necessary, to prevent condensation during operation of the actuator system 204.

In some examples, when generating control signals for the motor 212, the motor controller 206 can translate the control signals into a format and power level that can move the motor 212 to a specific position. The specific position can be defined in the one or more control signals as previously explained. The motor controller 206 can transmit the translated signals to the motor driver 210 in order to move the motor 212 to the specific position. Based on the translated signal from the motor controller 206 and provided by the motor driver 210, the motor 212 can rotate the motor belt drive pulley 226 to drive the timing belt 230, resulting in movement of the timing pulley drive ring 232 and, hence, the sensor carrier structure 220 with the sensors 104-108 in order to move or reposition the sensors 104-108 to the specific position.

In some examples, the motor controller 206 can be electrically coupled to a power supply 216. The power supply 216 can control the electrical flow and power to the motor controller 206. In some cases, the power supply 216 can also include or implement a power supply filtering and protection element 218. Moreover, the motor controller 206 can be communicatively connected to the internal computing system 110. The internal computing system 110 and the motor controller 206 can thus communicate data (e.g., instructions, commands, signals, sensor data, motor repositioning data, requests, information, content, etc.) to each other. In some cases, the motor controller 206 can send and/or receive data (e.g., instructions, commands, signals, sensor data, motor repositioning data, requests, information, content, etc.) to and/or from other devices through the internal computing system 110. For example, the motor controller 206 can send and/or receive data from sensors (e.g., 104-108), a remote computing system (e.g., 150), and/or any other remote device or location, through the internal computing system 150. Here, the internal computing system 150 can relay such data to and/or from the motor controller 206. In other cases, the motor controller 206 can communicate directly (or without going through the internal computing system 110) with other remote devices or locations.

In some examples, the motor controller 206 can include a communication interface that supports network communications to allow the motor controller 206 to communicate over one or more networks, such as a private network (e.g., a LAN), a public network (e.g., a WAN, a cloud network, etc.), a hybrid network, etc. For example, the motor controller 206 can include a communication interface that supports wireless communications, such as cellular communications, WIFI communications, etc.; wired or cable communications, such as Ethernet communications, fiber optic communications, etc.; and/or any other type of communications.

The sensor carrier structure 220 can be attached, coupled, or otherwise secured to the timing pulley drive ring 232 in a manner that allows the sensor carrier structure 220 to rotate and/or move relative to the timing pulley drive ring 232. Moreover, the sensors 104-108 can be attached, coupled, fixed, or otherwise secured to the sensor carrier structure 220 via a coupling or securing component, such as a sensor bracket 222. In some examples, the sensors 104-108 can be co-located on the sensor carrier structure 220. Thus, by using the timing belt 230 to move or reposition the sensor carrier structure 220 via the timing pulley drive ring 232, the motor 212 can also move or reposition the sensors 104-108 on the sensor carrier structure 220. Also, by affixing and/or co-locating the sensors 104-108 on the sensor carrier structure 220, any need to calibrate the sensors 104-108 or monitor their relative position can be reduced or eliminated, as the position (actual and relative) of the sensors 104-108 can be fixed and known.

The sensor carrier structure 220 can include, for example and without limitation, an articulating or positioning stage, frame, or platform for the sensors 104-108. For example, the sensor carrier structure 220 can be an azimuth positioning stage for the sensors 104-108. Moreover, in some examples, the sensor carrier structure 220 can be attached, coupled, fixed or otherwise secured to the actuator system 204 via the timing pulley drive ring 232 or a base that is mounted to the timing pulley drive ring 232.

In some cases, the chassis 236 and/or the sensor carrier structure 220 can be attached, coupled, fixed, placed, or otherwise secured to an external portion of the autonomous vehicle 102 to provide the sensors 104-108 access to, and/or visibility into, the outside or external environment. For example, the chassis 236 and the sensor carrier structure 220 can be securely placed on a pillar, such as an A-pillar, of the autonomous vehicle 102. In this example, the chassis 236 and the sensor carrier structure 220 can reside on an outside of the autonomous vehicle 102 between the windshield, the hood of the autonomous vehicle 102, and the passenger or driver's side. Thus, the sensors 104-108 can reside outside of the autonomous vehicle 102 and have access to, and/or visibility into, the outside or external environment.

In other cases, a portion of the chassis 236 and/or the sensor carrier structure 220 can be attached, coupled, fixed, placed, or otherwise secured to an internal portion of the autonomous vehicle 102, with another portion of the chassis 236 and/or the sensor carrier structure 220 extending, extruding, protruding, projecting and/or sticking out from the autonomous vehicle 102 to an outside of the autonomous vehicle 102. This way, the sensors 104-108 can reside outside of the autonomous vehicle 102 and thus have access to, and/or visibility into, the outside or external environment.

The motor 212 can move/rotate the motor belt drive pulley 226 to drive the timing belt 230, resulting in rotation of the timing pulley drive ring 232, the sensor carrier structure 220, and the sensors 104-108 any number of times as previously described, in order to adjust the position or angle of the sensors 104-108 as desired and thus the visibility and/or coverage of the sensors 104-108. For example, the motor 212 can move/rotate the motor belt drive pulley 226 to cause movement of the sensor carrier structure 220 and the sensors 104-108 as requested, periodically (e.g., at specific or random time intervals), randomly, and/or in response to one or more events, such as a maneuver of the autonomous vehicle 102, a change in position or motion of the autonomous vehicle 102, a detected human or object (e.g., another vehicle, a traffic sign, an object on the road, a guardrail, etc.), a detected condition (e.g., a condition of the autonomous vehicle 102, a condition of the external environment, a traffic condition, a road condition, a safety condition or threat, etc.), a navigation instruction, a predicted navigation event, etc.

The actuator system 204 can include bearings to support movement of, and reduce friction between, one or more moving parts of the motor 212, such as a rotor and a stator. The bearings can also provide increased axial, radial, and moment load capacity to the motor 212. Moreover, the bearings can be in contact with one or more elements or portions of the motor 212, as further described herein. In some examples the actuator system 204 can include bearings to support movement of, and reduce friction between the outer walls of the timing pulley drive ring 232 and the interior walls of the chassis 236, as further described herein.

In some examples, the actuator system 204 can also include a shaft seal to seal rotary elements (and/or elements in relative motion) in the actuator system 204, such as the motor 212, a shaft of the motor 212, a rotor of the motor 212, etc. In another example, the actuator system 204 can further include, within the chassis 236, a second shaft seal to seal the timing pulley drive ring 232. In some cases, the shaft seal can be located between the sensor carrier structure 220 and the actuator system 204.

In some implementations, the actuator system 204 can optionally include a brake 208. The brake 208 can be configured to hold and/or control a movement of the motor 212. In some cases, the brake 208 can be configured to control and/or manage a holding torque of the motor 212. Moreover, in some examples, the brake 208 in the actuator system 204 can be implemented below the motor 212 and the position sensor 214.

In some implementations, the chassis 236 can house the actuator system 204 and the helical service loop 234 and can have a small and/or cylindrical form factor. In other examples, the chassis 236 can have any other size, shape or design. Moreover, the chassis 236 can have one or more hollow sections, such as a hollow shaft, for the timing pulley drive ring 232 to pass through (e.g., from the bottom and through the middle of the assembly) the chassis 236, to the top of the chassis 236. This may allow for the helical service loop 234 to extend through bore of the timing pulley drive ring 232 to connect to the sensors 104-108 on the sensor carrier structure 220.

In some cases, one or more of the electronic components or hardware in the chassis 236 and/or the actuator system 204 can be implemented by one or more printed circuit boards (PCBs) or electronic circuits. Moreover, in some examples, the chassis 236 and/or the actuator system 204 can include a memory or storage device for storing data, a power supply for powering electronic components, a communication interface for communicating with other devices, and/or one or more processing components.

In some implementations, the sensor positioning platform 200 can include a surround view camera. The surround view camera can be included in, mounted on, coupled with, or otherwise secured to the chassis 236 of the sensor positioning platform 200. In some cases, the sensor positioning platform 200 can also include one or more cleaning systems for cleaning one or more of the sensors 104-108 on the sensor carrier structure 220. For example, the sensor positioning platform 200 can include a liquid cleaning system and a pneumatic cleaning system for using liquid and gasses (e.g., air, etc.) to clean image sensors (e.g., 106, 108) on the sensor carrier structure 220. The liquid cleaning system and the pneumatic cleaning system can each include a discharge element such as a nozzle, vent, or spraying device for controlling and enabling the flow, discharge, and/or projection of liquid and/or gasses to the sensors on the sensor carrier structure 220. The liquid cleaning system and the pneumatic cleaning system can also include a hose, pipe, tube, enclosed chamber, or enclosed carrier element, which can be attached, coupled, connected, affixed, or secured to the helical service loop 234 and can carry, provide, and/or direct liquid and gasses to the liquid cleaning system and the pneumatic cleaning system. The discharge elements in the liquid cleaning system and the pneumatic cleaning system can receive liquid and gasses from their respective hoses, pipes, tubes, enclosed chambers, or enclosed carrier elements, and can output (e.g., discharge, spray and/or project) the received liquid and gasses towards sensors on the sensor carrier structure 220 in order to clean those sensors.

In some examples, the motor controller 206, the power supply 216, the communications device 242, and/or the image processing engine 240 described above can be part of, or implemented by, the sensor positioning platform 200. In other examples, the motor controller 206, the power supply 216, the communications device 242, and/or the image processing engine 240 described above can be separate from the sensor positioning platform 200.

While the sensor positioning platform 200 and the actuator system 204 are shown in FIG. 2 to include certain components, one of ordinary skill will appreciate that the sensor positioning platform 200 and/or the actuator system 204 can include more or fewer components than those shown in FIG. 2. For example, in some instances, the sensor positioning platform 200 and/or the actuator system 204 can include one or more different or additional components such as one or more memory components (e.g., one or more RAMs, ROMs, caches, buffers, and/or the like), one or more processing devices that are not shown in FIG. 2, one or more transistors, one or more data communication components (e.g., network interfaces, communication devices, antennas, etc.), one or more storage devices (e.g., one or more hard drives, one or more solid-state drives, and/or the like), one or more circuits that are not shown in FIG. 2, one or more sensors that are not shown in FIG. 2, and/or any other electronic or mechanical component.

Figure 3:
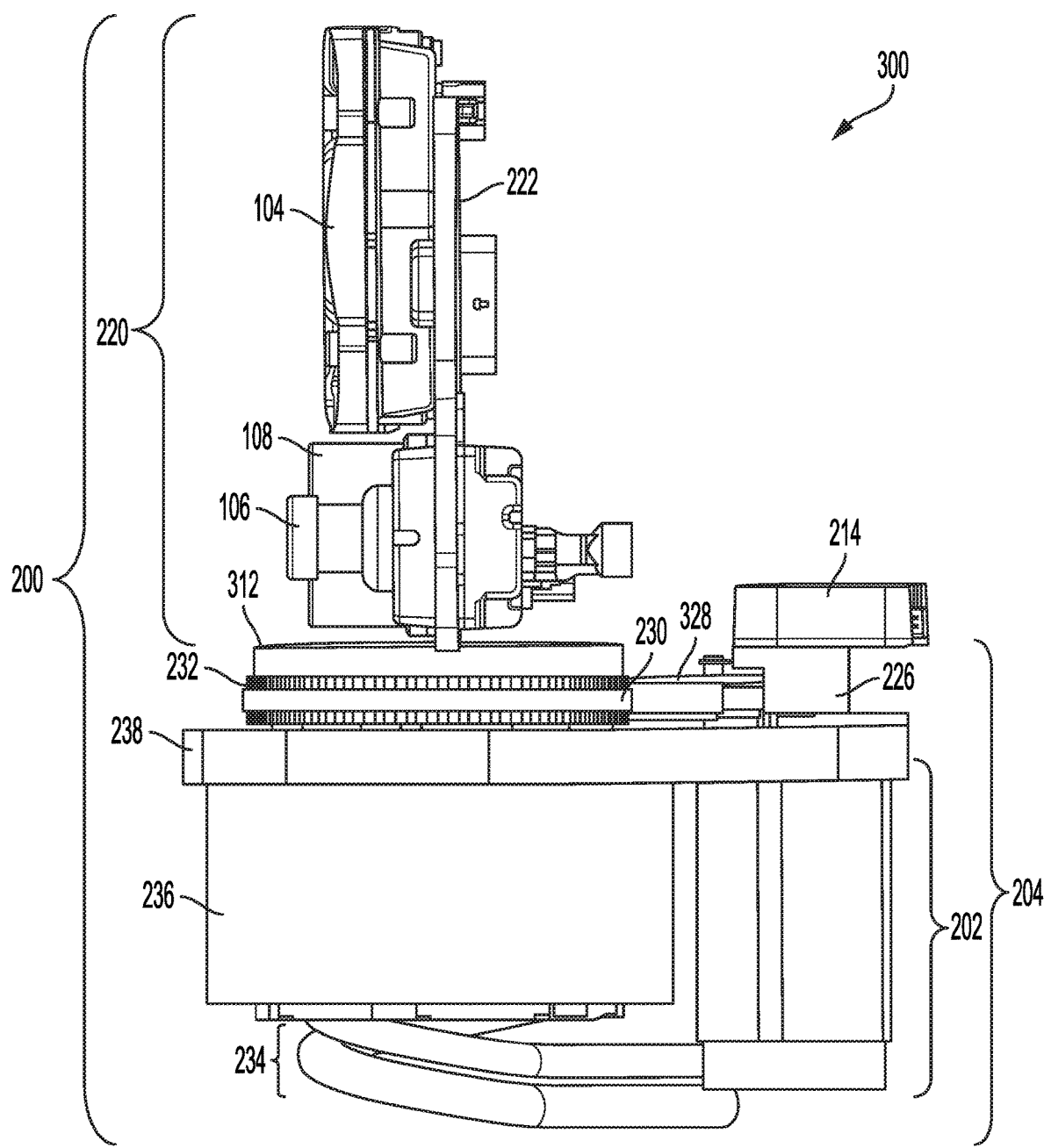
FIG. 3 illustrates a side view of an example configuration of a sensor positioning platform, in accordance with some examples.

FIG. 3 illustrates a side view 300 of an example configuration of a sensor positioning platform 200, in accordance with some examples. As shown, the sensor positioning platform 200 can include the sensor carrier structure 220, which includes or contains the sensors 104-108; the actuator system 204, which includes the motor control system 202, the timing pulley drive ring 232 extending from the top of a platform 238 to the bottom of the chassis 236, the motor belt drive pulley 226, an idler pulley 328, and the timing belt 230 itself; and the chassis 236, which includes or houses the timing pulley drive ring 232 and the helical service loop 234.

The sensor carrier structure 220 can include the sensors 104-108, a sensor bracket 222 for holding, securing, affixing, and/or restraining the sensors 104-108 to the sensor carrier structure 220, and one or more connector elements connected to one or more connector elements of the helical service loop 234 within a sensor carrier structure base 312. The helical service loop 234 may provide power and/or data connectivity to the sensors 104-108 on the sensor carrier structure 220.

In some examples, the sensor bracket 222 can be secured, affixed, coupled, attached, and/or connected to a base 312, which provides a platform or stage for the sensor carrier structure 220. The base 312 can be moved and/or rotated by the actuator system 204 via the timing pulley drive ring 232, which can apply a force to the base 312 to move and/or rotate the base 312. As the base 312 is moved or rotated by the actuator system 204, the sensor carrier structure 220 and sensors 104-108 can move and/or rotate (e.g., relative to the base 312) along with the base 312.

The chassis 236 can include the actuator system 204 for moving, rotating, and/or repositioning the sensor carrier structure 220 and the sensors 104-108 on the sensor carrier structure 220. For instance, the chassis 236 can include, within a hollow cylindrical portion extending from the top of a platform 238 of the chassis 236 to the bottom of the chassis 236, the timing pulley drive ring 232. The timing pulley drive ring 232 may also comprise a hollow cylindrical portion through which the helical service loop 234 may travel, in a helix, through the hollow cylindrical portion from the bottom of the chassis 236 to the one or more connector elements of the sensors 104-108. The helical service loop 234 can include one or more electrical connectors which can connect connector elements of the sensors 104-108 to allow the helical service loop 234 to provide power and data connectivity to the sensors 104-108. The base 312, as noted above, may be secured, affixed, coupled, attached, and or connected to the top surface of the timing pulley drive ring 232 such that rotational movement of the timing pulley drive ring 232 results in rotational movement of the base 312 and the sensor carrier structure 220.

In an example, the actuator system 204 further includes a motor control system 202. The motor control system 202 can include, without limitation, a rotor, a rotor shaft, a stator, a lower stator housing, an upper stator housing, a position sensor or encoder 214, bearings, seals, and springs. In some cases, the motor control system 202 can include one or more other components such as, for example, a brake, a power supply, a controller, etc.

In an example, the motor of the motor control system 202 is mechanically coupled to a motor belt drive pulley 226, which is used to drive a timing belt 230 of the actuator system 204 in order to generate rotational movement of the timing pulley drive ring 232 and, hence, the sensor carrier structure 220. For instance, the timing belt 230 may be arranged around the timing pulley drive ring 232 and the motor belt drive pulley 226 such that rotation of the motor belt drive pulley 226 by the motor results in movement of the timing belt 230 around the circumference of the timing pulley drive ring 232. As a result of the continuous contact between the timing belt 230 and the timing pulley drive ring 232, the movement of the timing belt 230 may result in the rotational movement of the timing pulley drive ring 232. As noted above, the tension of the timing belt 230 may be maintained using a tension arm pulley, which includes a tension arm that maintains pressure on the timing belt 230 and, thus, prevents backlash of the timing belt 230 during operation of the motor. In an example, the actuator system 204 further includes an idler pulley 328 that regulates the performance of the timing belt 230 during operation of the motor.

In some cases, the chassis 236 can include a securing element (not shown) for securing, attaching, coupling, or affixing the sensor positioning platform 200 to the autonomous vehicle 102. In some examples, the securing element can be a rotating or articulating element or member that can rotate, pivot, or reposition the chassis 236 (and thus the sensor carrier structure 220 and sensors 104-108) along an axis of rotation or motion such as a roll axis (e.g., Z axis).

As previously noted, the actuator system 204 can exert force (e.g., via the motor 212) on the timing pulley drive ring 232, via movement of the timing belt 230, in order to adjust or control the position, angle, orientation, and/or movement of the sensor carrier structure 220. For example, the actuator system 204 generate movement of the timing belt 230 to exert force on the timing pulley drive ring 232 to rotate the base 312 of the sensor carrier structure 220 and, hence, the sensor carrier structure 220 to a requested or specified position or angle. As the base 312 and the sensor carrier structure 220 rotate, the sensors 104-108 can also rotate with the base 312 and sensor carrier structure 220. Thus, such rotation of the base 312 and sensor carrier structure 220 can reposition the sensors 104-108 and adjust the orientation, position, field of view and/or coverage of the sensors 104-108.

The sensors 104-108 can be affixed, coupled, secured, connected, and/or attached to the sensor carrier structure 220 via the sensor bracket 222, such that the sensors 104-108 can move with the sensor carrier structure 220 when the sensor carrier structure 220 is rotated, repositioned, or otherwise moved by the actuator system 204. The sensor carrier structure 220 can thus serve as a positioning stage or platform for the sensors 104-108. For example, in some cases, the sensor carrier structure 220 can serve as an azimuth positioning stage for the sensors 104-108. Moreover, in some examples, the sensors 104-108 can be fixed or statically secured to the sensor carrier structure 220 such that the sensors 104-108 maintain the same (or substantially the same) location, position, angle, view, etc., relative to each other and the sensor carrier structure 220.

In some cases, the sensor carrier structure 220 can rotate along a horizontal or yaw axis (e.g., X axis) and thus can provide the sensors 104-108 rotational movement along the horizontal or yaw axis. In other cases, the sensor carrier structure 220 can rotate along various axes and thus can provide the sensors 104-108 multiple degrees of freedom. For example, in some cases, the sensor carrier structure 220 can rotate along a horizontal or yaw axis (e.g., X axis) and a vertical or pitch axis (e.g., Y axis) and thereby provide the sensors 104-108 rotational movement along the horizontal or yaw axis as well as the vertical or pitch axis. In some cases, the sensor carrier structure 220 can also extend up or down or otherwise move the sensors 104-108 up or down to adjust the altitude or height of the sensors 104-108.

As noted above, the timing pulley drive ring 232 can include a hollow bore to run, as part of the helical service loop 234, pneumatic and/or liquid hoses through the timing pulley drive ring 232 and to liquid and/or pneumatic cleaning systems that can output gasses and/or liquid towards the sensors 104-108 in order to clean the sensors 104-108 on the sensor carrier structure 220. In some cases, the pneumatic and/or liquid cleaning systems can reside on a stationary portion of the sensor positioning platform 200, such as a portion of the chassis 236 (not shown). The pneumatic and/or liquid cleaning systems can output gasses and/or liquid towards the sensors 104-108 and/or as the sensors 104-108 rotate within a distance or reach of the pneumatic and/or liquid cleaning systems. In other cases, the pneumatic and/or liquid cleaning systems can reside on a rotating portion of the sensor positioning platform 200, such as a portion of the base 312 of the sensor carrier structure 220. The pneumatic and/or liquid cleaning systems can thus rotate with the sensors 104-108 and can output gasses and/or liquid towards the sensors 104-108 at any time.

In some examples, such hollow space or bore in the timing pulley drive ring 232 can also be used to run, as part of the helical service loop 234, sensor data and power cables through the chassis 236 and to the sensors 104-108 on the sensor carrier structure 220. In some cases, the hollow space or bore in the timing pulley drive ring 232 can be used to run the sensor data and power cables, as well as the pneumatic and/or liquid hoses, through the chassis 236. In other cases, the hollow space or bore in the timing pulley drive ring 232 can be used to run either the sensor data and power cables or the pneumatic and/or liquid hoses through the chassis 236.

In the example shown in FIG. 3, the sensor carrier structure 220 includes a radar sensor 104, and two co-located image sensors 104-106, such as a visible light image sensor and an IR image sensor. However, it should be noted that this configuration is provided as a non-limiting example for explanation purposes, and other configurations are also contemplated herein. For example, in other configurations, the sensor carrier structure 220 can include more or less sensors than those shown in FIG. 3, one or more different types of sensors than those shown in FIG. 3, one or more of the same type of sensors as those shown in FIG. 3, and/or a different combination or placement of sensors than that shown in FIG. 3. To illustrate, in some examples, the sensor carrier structure 220 can include one or more image sensors (e.g., a visible light camera, an IR camera, etc.), one or more radars, and/or one or more other types of sensors such as LIDARs, IMUs, etc.

FIG. 4A illustrates a rear view of an example configuration of a sensor positioning platform 200, in accordance with some examples. As illustrated in FIG. 4A, the sensor positioning platform 200 includes the sensor carrier structure 220, which can be secured, affixed, coupled, or mounted to the a top portion of the timing pulley drive ring 232 via a base 312. The base 312 and sensor carrier structure 220 may cover and encompass the hollow bore of the timing pulley drive ring 232. Thus, the sensor carrier structure 220, comprising the sensors 104-108 and the sensor bracket 222 may rotate or otherwise move in conjunction with rotations or movements of the timing pulley drive ring 232. For instance, when the motor of the motor control system 202 causes rotation or movement of the motor belt drive pulley 226, the motor belt drive pulley 226 may drive a motion of the belt 230, resulting in the rotational movement of the timing pulley drive ring 232.

The actuator system 204, which may include the motor control system 202, the motor belt drive pulley 226, the timing pulley drive ring 232, and the timing belt 230, may also include the helical service loop 234. As noted above, the helical service loop 234 may comprise pneumatic and/or liquid hoses, as well as sensor data and power cables that may run through the hollow bore of the timing pulley drive ring 232 within the chassis 236 in a helix configuration to the connector elements of the sensors 104-108 of the sensor carrier structure 220. As the timing pulley drive ring 232 rotates as a result of the timing belt 230 being driven by the motor belt drive pulley 226 mechanically engaged to the motor, the helical service loop 234 may also rotate within the hollow bore of the timing pulley drive ring 232 due to the movement of the sensor carrier structure 220 and the sensors 104-108. The ability of the helical service loop 234 to rotate within the hollow bore of the timing pulley drive ring 232 may result in strain relief of the wiring and hoses that comprise the helical service loop 234 during the rotational movement of the timing pulley drive ring 232 and the sensor carrier structure 220.

As noted above, the actuator system 204 may further include an idler pulley 328 and a tension arm pulley 228 that may be used to regulate the movement of the timing belt 230 and to maintain tension on the timing belt 230 during operation of the motor, respectively. These pulleys 228, 328 may ensure that the timing belt 230 maintains contact with the timing pulley drive ring 232 to allow for rotational movement of the timing pulley drive ring 232 in response to rotational movement of the motor belt drive pulley 226. The idler pulley 328, tension arm pulley 228, and the motor belt drive pulley 226 may be mounted on to the platform 238 of the chassis 236 in order to provide stable movement of the timing belt 230 during operation of the motor and corresponding rotational movement of the timing pulley drive ring 232.

The actuator system 204 may further include a position sensor 214, which is used to obtain position measurements for the motor 212 and of the motor belt drive pulley 226. This position sensor 214, as illustrated in FIG. 4A, may be mechanically engaged with the motor belt drive pulley 226 via a rotor shaft that connects the motor to the motor belt drive pulley 226 to allow for the motor to rotate the motor belt drive pulley 226 and, hence, drive the timing belt 230. This position sensor 214 can include one or more sensor devices, which can include any type of sensor, encoder, transducer, detector, transmitter, and/or sensing component capable of measuring the position (e.g., linear, angular, etc.) and/or change of position of a target or object, such as the motor and the motor belt drive pulley 226.

FIG. 4B illustrates a front view of an example configuration of a sensor positioning platform 200, in accordance with some examples. In this example, the timing belt 230 is in mechanical contact with the timing pulley drive ring 232 along a portion of the outer circumference of the timing pulley drive ring 232. As the timing belt 230 is driven by the motor via the motor belt drive pulley, the timing pulley drive ring 232 may rotate in the direction of the timing belt movement along the portion of the outer circumference of the timing pulley drive right 232.

As noted above, the base 312 and sensor carrier structure 220 may cover and encompass the hollow bore of the timing pulley drive ring 232. Thus, the base 312 and sensor carrier structure 220 may rotate along with the timing pulley drive ring 232 in response to the driving of the timing belt 230.

Figure 5:
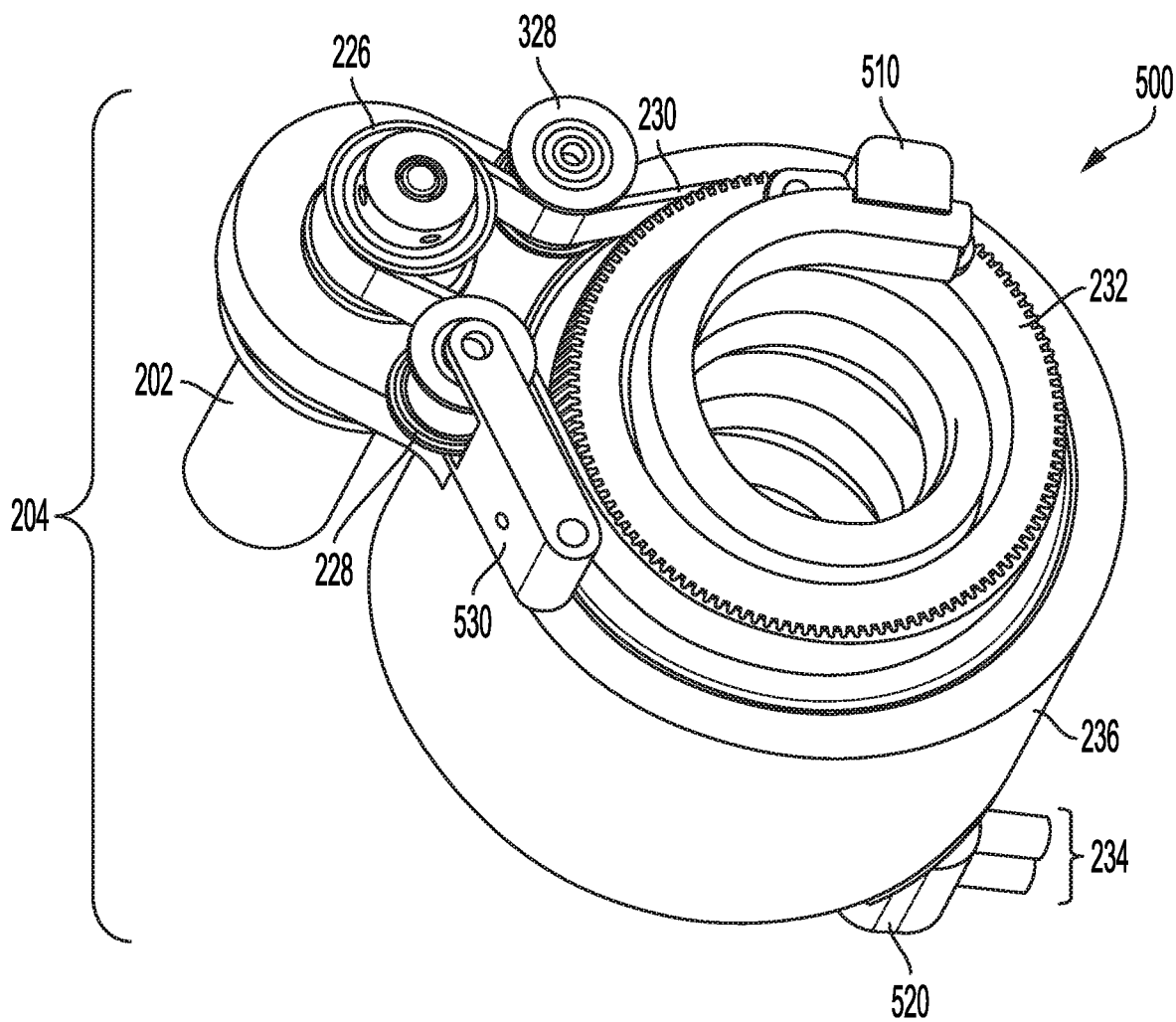
FIG. 5 illustrates an overhead view of an actuator system of a sensor positioning platform, in accordance with some examples.

FIG. 5 illustrates an overhead view 500 of an actuator system 204 of a sensor positioning platform, in accordance with some examples. As illustrated in FIG. 5, the actuator system 204 may comprise a motor control system 202 that includes a motor that is mechanically coupled to a motor belt drive pulley 226. The motor belt drive pulley 226 may be installed on an upper surface of the chassis 236 in order to drive a timing belt 230 of the actuator system 204, which may generate rotational movement of the timing pulley drive ring 232. Additionally, the actuator system 204 may include a tension arm pulley 228 and a tension arm 530 affixed to a shaft of the tension arm pulley 228. The tension arm 530 may maintain contact with the timing belt 230 during operation of the motor to ensure that tension is maintained on the timing belt 230, resulting in continuous contact with the timing pulley drive ring 232 and reducing belt backlash. The actuator system 204 may also include an idler pulley 328 that is installed on to the upper surface of the chassis 236 in order to regulate the movement of the timing belt 230.

The timing pulley drive ring 232 may include a hollow bore through which a helical service loop 234 may be introduced. The helical service loop 234 may be coiled in a helix configuration within the hollow bore of the timing pulley drive ring 232 to allow for rotational movement of the helical service loop 234 in conjunction with the rotational movement of the timing pulley drive ring 232.

In an example, a movable grip 510 is secured, affixed, coupled, or mounted to the timing pulley drive ring 232 to secure an end of the helical service loop 234 that provides power and data connectivity to the sensors, as well as gasses and water to a cleaning system that may be used to clean the sensors. The movable grip 510 may ensure that the connection between the helical service loop 234, the sensors, and the cleaning system is maintained during rotational movement of the timing pulley drive ring 232, as the sensors and cleaning system may also rotate in conjunction with this rotational movement of the timing pulley drive ring 232. As will be described in greater detail below, an opposite end of the helical service loop 234 may be secured at a lower surface of the chassis 236 using a stationary grip 520. This stationary grip 520 is secured, affixed, coupled, or mounted to the lower surface of the chassis 236 in order to maintain the opposite end of the helical service loop 234 stationary during the rotational movement of the timing pulley drive ring 232.

Figure 6:
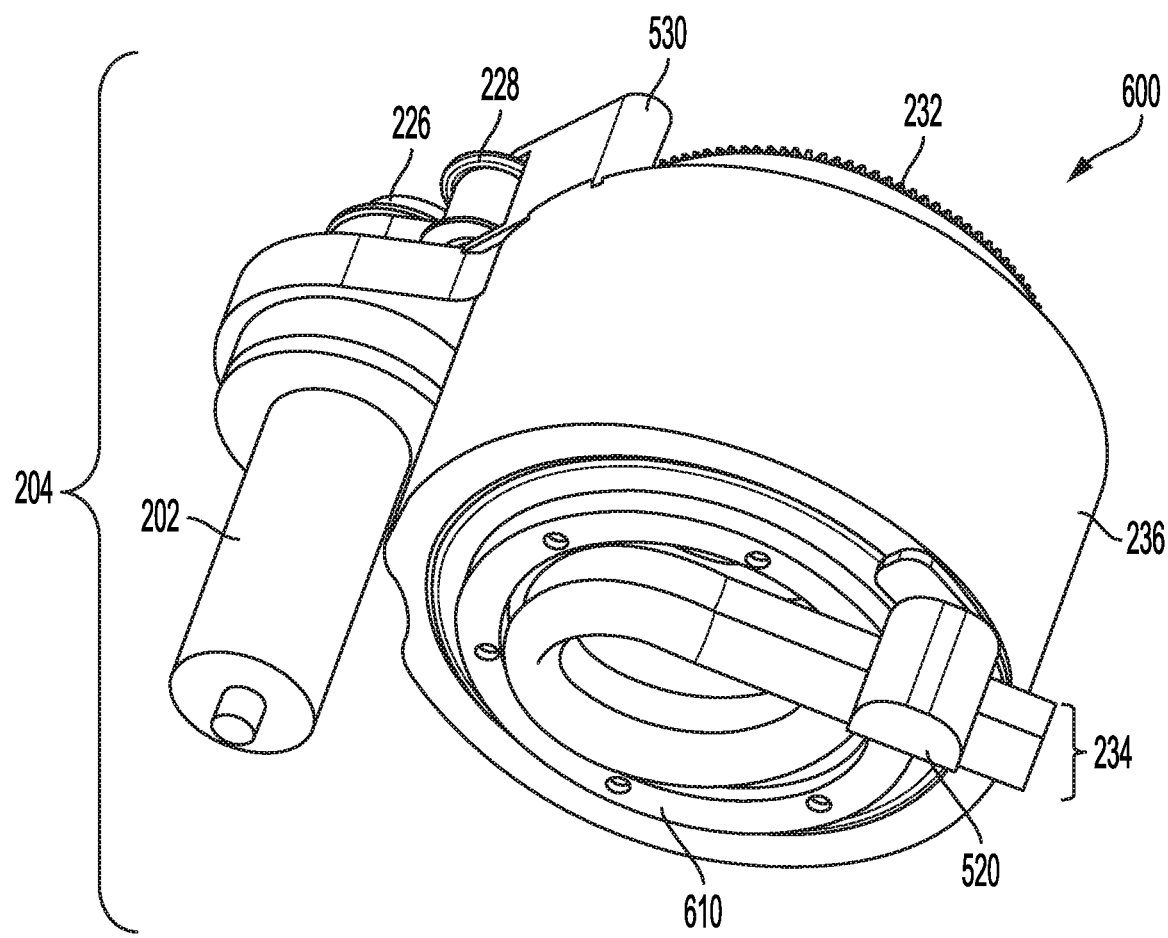
FIG. 6 illustrates an underneath view of an actuator system of a sensor positioning platform, in accordance with some examples.

FIG. 6 illustrates an underneath view 600 of an actuator system 204 of a sensor positioning platform, in accordance with some examples. As illustrated in FIG. 6, the actuator system 204 includes the motor control system 202, which may include the motor and other components that may be used to rotate the motor belt drive pulley 226 and drive the timing belt around the timing pulley drive ring 232. The actuator system 204 may also include a tension arm pulley 228 and a tension arm 530 that may be used to regulate movement of the timing belt and ensure that tension is maintained on the timing belt during operation of the motor. Thus, the tension arm 530 may serve to reduce or otherwise eliminate backlash from the timing belt as it is being driven by the motor via the motor belt drive pulley 226.

As noted above, the actuator system 204 may include a stationary grip 520 that is secured, affixed, coupled, or mounted to the lower surface of the chassis 236 in order to maintain the opposite end of the helical service loop 234 stationary during the rotational movement of the timing pulley drive ring 232. The stationary grip 520 may be positioned to maintain an orientation of the helical service loop 234 for connecting the lower end of the helical service loop 234 to the internal computing system, power supplies, gasses/water tanks, and other components of the sensor positioning platform 200 that may be stationary during the operation of the autonomous vehicle. This may ensure that the connection between the helical service loop 234 and these stationary components is maintained during any rotational movement of the timing pulley drive ring 232.

In an embodiment, the actuator system 204 includes a mounting bracket 610 configured to maintain the timing pulley drive ring 232 in position within the chassis 236 to prevent any aberrant movement during the driving of the timing belt and resulting rotational movement of the timing pulley drive ring 232. The mounting bracket 610 may include a set of bearing to allow for the rotational movement of the timing pulley drive ring 232 in response to the driving of the timing belt by the motor and motor belt drive pulley 226.

Figure 7:
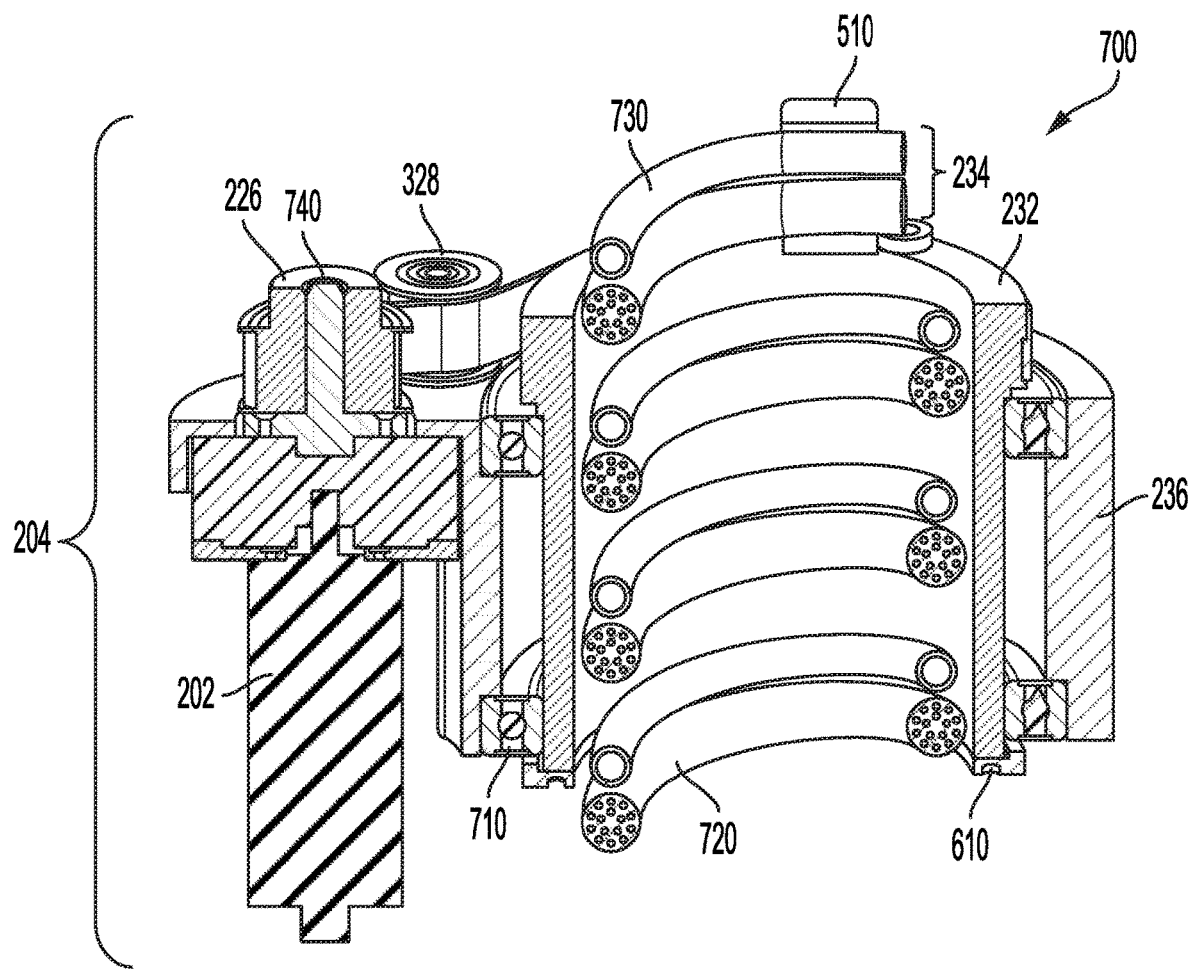
FIG. 7 illustrates a cross-sectional view of an actuator system of a sensor positioning system, in accordance with some examples.

FIG. 7 illustrates a cross-sectional view 700 of an actuator system 204 of a sensor positioning system, in accordance with some examples. As illustrated in FIG. 7, the motor control system 202 may be mechanically engaged with the motor belt drive pulley 226 via a pulley shaft assembly 740. The pulley shaft assembly 740 may be driven by the motor of the motor control system 202, resulting in rotational movement of the motor belt drive pulley 226. The rotational movement of the motor belt drive pulley 226 may result in the movement of the timing belt. This, in turn, may cause the rotational movement of the timing pulley drive ring 232 in the direction of the timing belt movement along a portion of the outer circumference of the timing pulley drive ring 232. The actuator system 204 may also include the idler pulley 328, which may regulate the movement of the timing belt as it is being driven by the motor belt drive pulley 226 and the motor.

As noted above, the actuator system 204 further includes a helical service loop 234 within the hollow bore of the timing pulley drive ring 232. As illustrated in FIG. 7, the helical service loop 234 may be coiled along the inner circumference of the hollow bore of the timing pulley drive ring 232 in a helix configuration. At an upper end of the timing pulley drive ring 232, an upper end of the helical service loop 234 may be secured, affixed, coupled, or mounted to the movable grip 510. The movable grip 510 may further be secured, affixed, coupled, or mounted to an upper surface of the timing pulley drive ring 232. Thus, the movable grip 510 may rotate with the timing pulley drive ring 232 in response to movement of the timing belt caused by the motor belt drive pulley 226 and motor. Further, the upper end of the helical service loop 234, which may be connected to the one or more sensors of the sensor carrier structure, may also move in conjunction with the rotational movement of both the movable grip 510 and the timing pulley drive ring 232. This may cause the helical service loop 234 to also move along a rotational axis within the hollow bore of the timing pulley drive ring 232.

The helical service loop 234 may comprise an electrical wiring bundle 720, which can include data lines that connect the sensors to a communications device and/or an image processing engine. The data lines can allow the sensors to communicate with the communications device to send and receive data signals (e.g., sensor data, instructions, commands, information, etc.) to and from the communications device. Moreover, the data lines can allow image sensors on the sensor carrier structure to provide, to the image processing engine, image data (e.g., images, videos, frames, etc.)

captured by such image sensors. The electrical wiring bundle 720 may further include one or more power cables, which may be used to provide power, from a power supply, to the one or more sensors.

In addition to the electrical wiring bundle 720, the helical service loop 234 can include an enclosed carrier element 730 (e.g., hose, pipe, tube, enclosed chamber, etc.) which can be attached, coupled, connected, affixed, or secured to the helical service loop 234 and can carry, provide, and/or direct liquid and gasses to the liquid cleaning system and the pneumatic cleaning system of the sensor positioning platform. It should be noted that the enclosed carrier element 730 may comprise a plurality of components that may separately carry water and/or gasses to the cleaning systems of the sensor positioning system. For instance, o carry liquid and gasses to the liquid cleaning system and the pneumatic cleaning system, a liquid hose and one or more pneumatic hoses can be implemented within the helical service loop 234. In some examples, these components can thus travel through at least a portion of a hollow bore of the timing pulley drive ring 232.

In an embodiment, the chassis 236 includes one or more sets of bearings 710 within the bore of the chassis 236. These bearings 710 may support movement of, and reduce friction between the outer walls of the timing pulley drive ring 232 and the interior walls of the chassis 236 bore. Thus, friction within the chassis 236 may be reduced as the timing pulley drive ring 232 rotates to a new position in response to movement of the timing belt. To ensure that the timing pulley drive ring 232 is properly aligned with the bearings 710, the actuator system 204 may further include a mounting bracket 610 configured to maintain the timing pulley drive ring 232 in position within the chassis 236. The mounting bracket 610 may prevent any aberrant movement during the driving of the timing belt and resulting rotational movement of the timing pulley drive ring 232. As noted above, the mounting bracket 610 may include a set of bearing to allow for the rotational movement of the timing pulley drive ring 232 in response to the driving of the timing belt by the motor and motor belt drive pulley 226.

Figure 8:
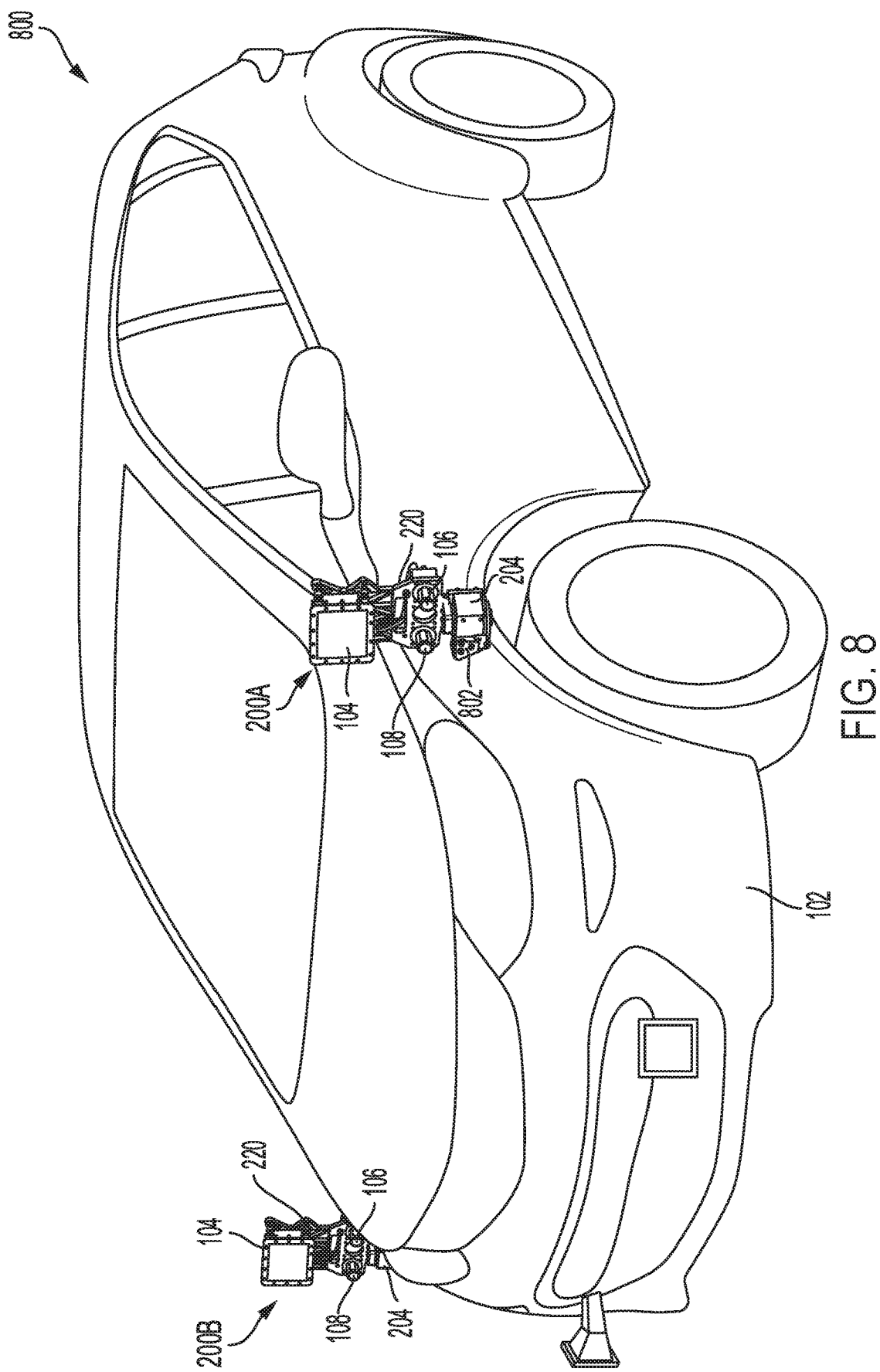
FIG. 8 illustrates an example configuration of an autonomous vehicle with sensor positioning platforms on each side of the autonomous vehicle, in accordance with some examples.

FIG. 8 illustrates an example configuration 800 of an example autonomous vehicle 102 with sensor positioning platforms 200A-B on each side of the autonomous vehicle 102. In this example, the autonomous vehicle 102 includes a first sensor positioning platform 200A on the driver's side of the autonomous vehicle 102 and a second sensor positioning platform 200B on the passenger's side of the autonomous vehicle 102. The sensor positioning platforms 200A-B can include respective sensor carrier structures 220 containing sensors 104-108, respective stationary platform assemblies housing respective actuator systems (e.g., 204), and a respective securing element 802 for securing the sensor positioning platforms 200A-B to the autonomous vehicle 102.

Through the sensor positioning platforms 200A-B, the sensors 104-108 on the respective sensor carrier structures 220 can have access and visibility to the outside or external environment, allowing the sensors 104-108 to collect sensor data and measurements (e.g., images, videos, radar sensor data, laser sensor data, structured light data, etc.) of the outside or external environment associated with the autonomous vehicle 102. The sensor carrier structures 220 on the sensor positioning platforms 200A-B can be moved, positioned, rotated, oriented, etc., as previously explained, to allow the sensors 104-108 to collect sensor data and measurements from different positions, angles, locations, perspectives, field of views or coverage, etc. In some cases, the sensors 104-108 can continuously or periodically collect sensor data and measurements from a current position, an adjusted position, and/or as the sensors 104-108 are repositioned (e.g., rotated, oriented, etc.).

The ability to reposition the sensors 104-108 and obtain sensor data and measurements from different dimensions of space and time can allow the sensors 104-108 to collect sensor data and measurements from a wide variety of perspectives, and can increase the addressable field of regard of the sensors 104-108, vary the instantaneous field of view of the sensors 104-108, allow an increase and/or reduction of an allowable tracking error, etc. Moreover, the autonomous vehicle 102 can use the sensor data and measurements from the sensors 104-108 for one or more operations such as, for example, detection operations (e.g. detecting fixed and/or moving objects, animals, humans, etc.; detecting environment conditions; detecting scenes or views; etc.), tracking operations, localization operations, mapping operations, planning operations, safety operations, navigation operations, and so forth.

Figure 9:
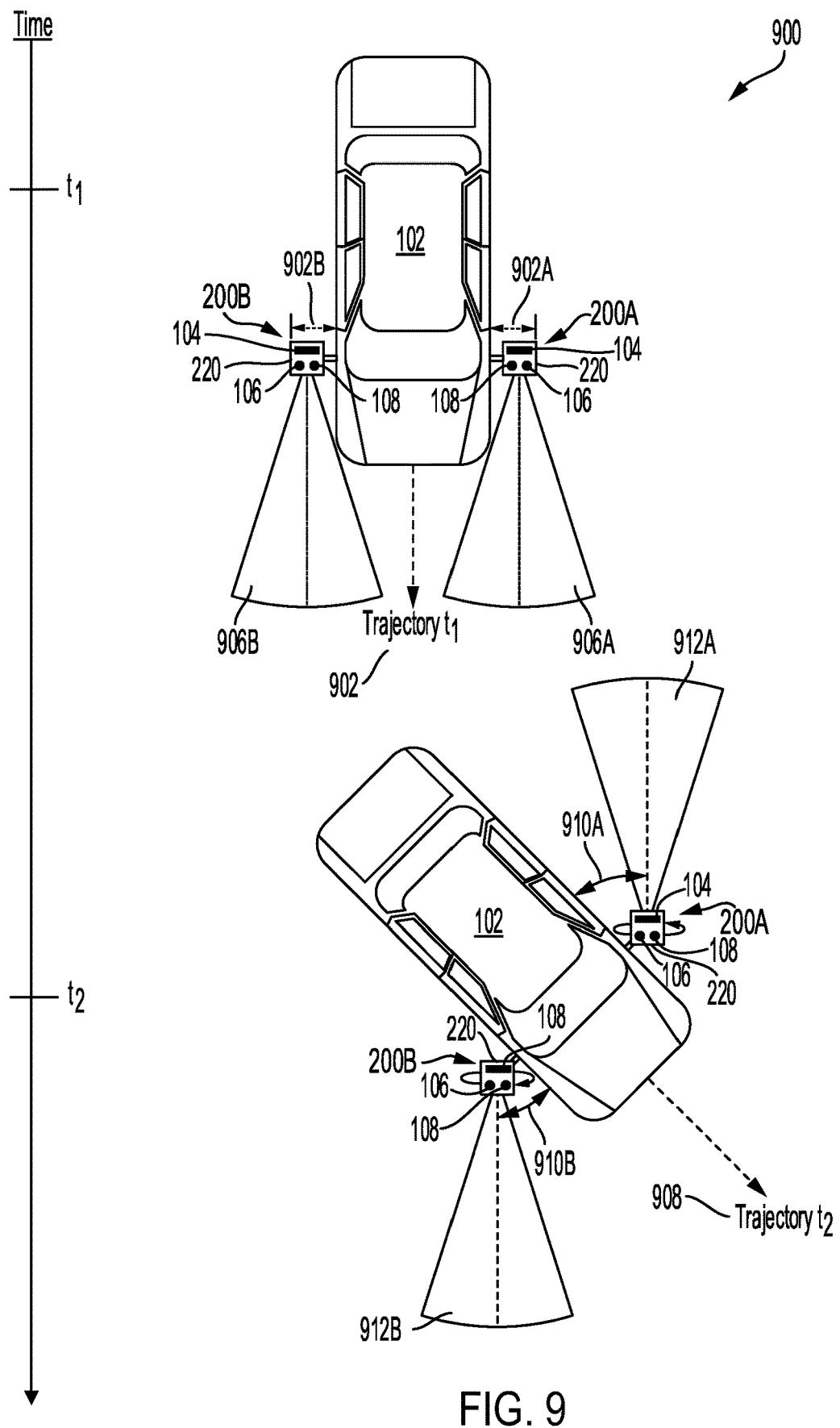
FIG. 9 illustrates an example use of sensor positioning platforms on an autonomous vehicle, in accordance with some examples.

FIG. 9 illustrates an example use 900 of sensor positioning platforms 200A-B on an autonomous vehicle 102. In this example, the autonomous vehicle 102 is traveling in a linear trajectory 902 at time $t_1$. The autonomous vehicle 102 includes a sensor positioning platform 200A on the driver side and a sensor positioning platform 200B on the passenger side. The sensor carrier structures 220 on the sensor positioning platforms 200A-B include sensors 104-108 which are actively, continuously, or periodically collecting sensor data and measurements from their respective positions or perspectives as the autonomous vehicle 102 travels along the trajectory 902.

At $t_1$, the sensor carrier structure 220 on the sensor positioning platform 200A is positioned at a first rotation angle 902A or yaw, relative to the autonomous vehicle 102 (and/or the trajectory 902 of the autonomous vehicle 102), and the sensor carrier structure 220 on the sensor positioning platform 200B is positioned at a second rotation angle 902B relative to the autonomous vehicle 102 (and/or the trajectory 902 of the autonomous vehicle 102). The first rotation angle 902A and the second rotation angle 902B can be the same or different.

Given the first rotation angle 902A associated with the sensor carrier structure 220 on the sensor positioning platform 200A, the sensors 104-108 on that sensor carrier structure 220 have a specific field of view 906A at $t_1$, which is at least partly based on the first rotation angle 902A of the sensor carrier structure 220 on which those sensors 104-108 reside. Similarly, given the second rotation angle 902B associated with the sensor carrier structure 220 on the sensor positioning platform 200B, the sensors 104-108 on that sensor carrier structure 220 have a specific field of view 906B at $t_1$, which is at least partly based on the second rotation angle 902B of the sensor carrier structure 220 on which those sensors 104-108 reside.

As shown in FIG. 9, at $t_2$, the autonomous vehicle 102 is making a turn and has consequently changed its direction of travel to a different trajectory 908. As (or before) the autonomous vehicle 102 turns and travels in the different trajectory 908, the sensor carrier structures 220 on the sensor positioning platforms 200A-B can be repositioned to different rotational angles 910A-B. The sensor carrier structures 220 can be repositioned by the respective actuator systems 204 (e.g., via the motors 212) on the sensor positioning platforms 200A-B, as previously explained. The sensor carrier structures 220 can be repositioned to adjust the position of the sensors 104-108 on the sensor positioning platforms 200A-B in order to achieve different fields of view 912A-B, which can be based at least partly on the different rotational angles 910A-B, and obtain sensor data for different areas of interest at least partly within the different fields of view 912A-B.

In one illustrative example, the different areas of interest can include an area along the different trajectory 908 which the autonomous vehicle 102 is crossing or plans to cross, and an area that the autonomous vehicle 102 needs to check for objects (e.g., oncoming/incoming vehicles, pedestrians, etc.) before or while the autonomous vehicle 102 travels in or towards the different trajectory 908 (e.g., before or while the autonomous vehicle 102 crosses a lane, makes a turn, makes a maneuver, changes direction, etc.). Other non-limiting examples of areas of interest that can be targeted through the repositioning of the sensor carrier structures 220 can include an area where a certain object or condition is located that the autonomous vehicle 102 is tracking, a blind spot, an area for which the autonomous vehicle 102 wants to collect more sensor data (e.g., to gain greater insight or visibility into the area and/or the surrounding environment, to confirm that no safety hazards or approaching objects exist, etc.), an area for which the autonomous vehicle 102 wants to get new or additional sensor data, and/or any other area that may be of interest to the autonomous vehicle 102 for any reason (e.g., safety, navigation, visibility, localization, mapping, etc.).

In some cases, the repositioning of the sensor carrier structures 220 at $t_2$ (and/or the different rotational angles 910A-B) can be calculated and/or performed in response to, or in anticipation of, the different trajectory 908 and/or a change (actual and/or predicted) in direction or trajectory of the autonomous vehicle 102 between $t_1$ and $t_2$. For example, the different rotational angles 910A-B can be selected and/or calculated to account for the different trajectory 908, a change in the relative position or motion of the autonomous vehicle 102 and other objects due to the different trajectory 908, a change in the surrounding environment and/or circumstances of the autonomous vehicle 102 due to the different trajectory 908, a gap in visibility and/or current data due to the different trajectory 908, a need to gain additional perspectives due to the different trajectory 908, a need to supplement the data or estimates for one or more areas due to the different trajectory 908, and/or any other reason or condition prompted by the autonomous vehicle 102 changing its direction of travel to the different trajectory 908.

Figure 10:
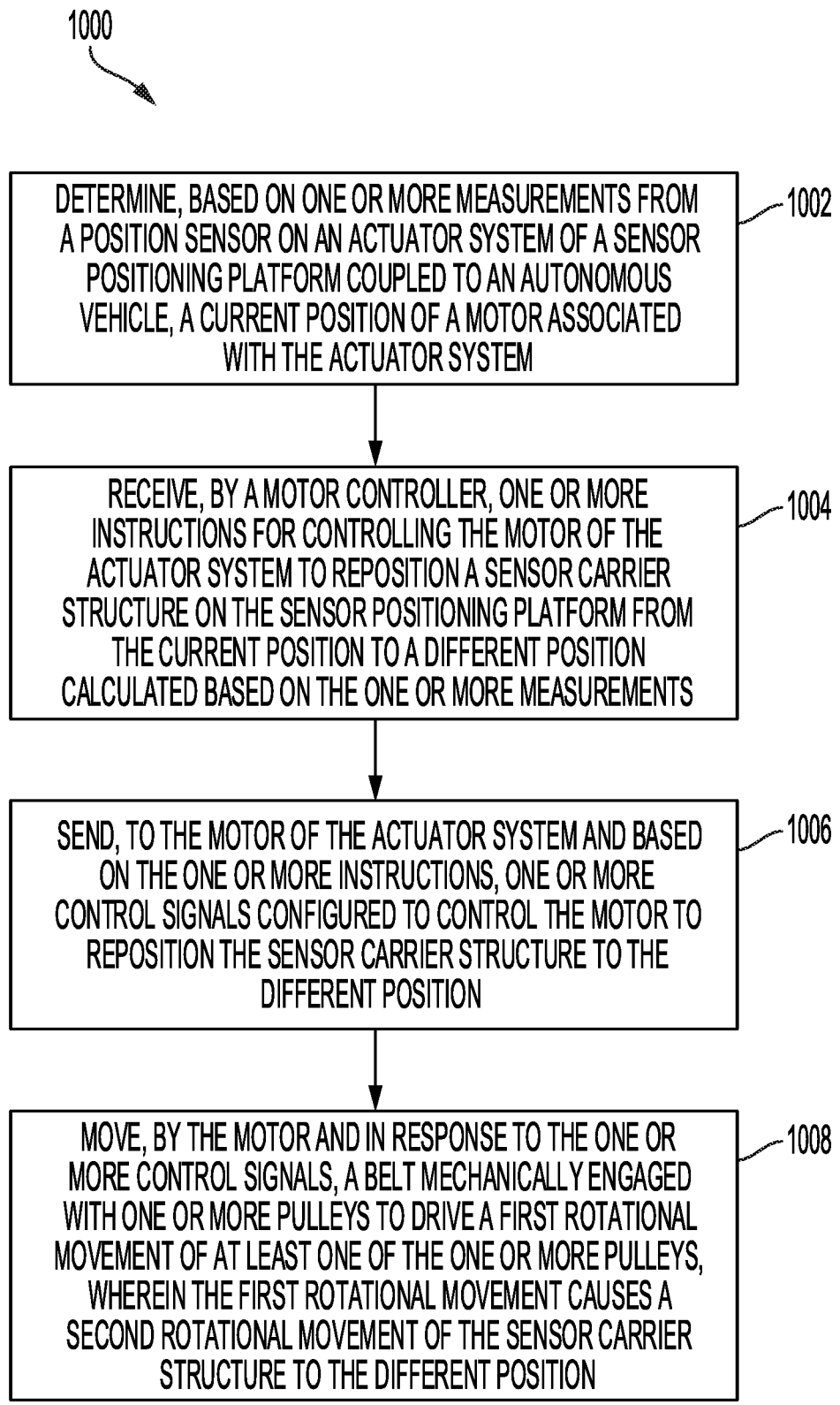
FIG. 10 illustrates an example method for implementing a sensor positioning platform on an autonomous vehicle, in accordance with some examples.

Having disclosed some example system components and concepts, the disclosure now turns to FIG. 10, which illustrates an example method 1000 for implementing a sensor positioning platform on an autonomous vehicle. The steps outlined herein are exemplary and can be implemented in any combination thereof, including combinations that exclude, add, or modify certain steps.

At step 1002, the method 1000 can include determining, based on one or more measurements from a position sensor (214) on an actuator system (204) of a sensor positioning platform (200) coupled to an autonomous vehicle (102), a current position of a motor (212) associated with the actuator system (204). The one or more measurements can indicate or measure a current position (e.g., angle, location, etc.) of the motor (212) sensed by the position sensor (214). The position sensor (214) can calculate the one or more measurements and report them to another device or component, such as a motor controller (206) and/or an internal computing system (110) on the autonomous vehicle (102), for example.

In some cases, the one or more measurements can be used to determine, estimate, or infer a current position of a sensor carrier structure (220) on the sensor positioning platform (200) and/or sensors (104-108) on the sensor carrier structure (220). Moreover, in some examples, the one or more measurements of the current position of the motor (212) can be used to determine whether the sensor carrier structure (220) and/or the sensors on the sensor carrier structure (220) should be repositioned, determine how to reposition the sensor carrier structure (220) and/or the sensors on the sensor carrier structure (e.g., where they should be repositioned to, how much to move or rotate them, etc.), etc.

At step 1004, the method 1000 can include receiving, by a motor controller (206), one or more instructions for controlling the motor (212) of the actuator system (204) to reposition a sensor carrier structure (220) on the sensor positioning platform (200) from the current position to a different position calculated based on the one or more measurements. The sensor carrier structure (220) can include a plurality of sensors (104-108), such as a radar, an image sensor, a thermal image sensor, etc. Moreover, in some cases, the different position can be calculated and/or a determination that the sensor carrier structure (220) should be repositioned can be made using additional information.

For example, to calculate the different position and/or determine that the sensor carrier structure (220) should be repositioned, various factors can be considered such as conditions associated with the autonomous vehicle (e.g., environment conditions or events, traffic or road conditions, navigation conditions, etc.), an operation of the autonomous vehicle (e.g., a current or future state of the autonomous vehicle, a status of the autonomous vehicle, etc.), a state and/or condition of the sensors on the sensor carrier structure (e.g., visibility, obstructions, errors, cleanliness, etc.), and/or any other events or data relevant to determining whether the sensors should be repositioned to clean them, obtain better visibility or accuracy, protect them from a hazard, adjust their FOV, etc.

In some cases, the motor controller (206) can receive the one or more instructions from a device or component associated with the motor controller (206), such as a processor that determined that the sensor carrier structure (220) should be repositioned and/or generated the one or more instructions. In other cases, the motor controller (206) can receive the one or more instructions from a separate device, such as an internal computing system (110) on the autonomous vehicle (102). For example, the internal computing system (110) can use the one or more measurements to determine that the sensor carrier structure (220) should be repositioned and/or where the sensor carrier structure (220) should be repositioned to, and provide to the motor controller (206) the one or more instructions for repositioning the sensor carrier structure (220).

In some examples, in addition to using the one or more measurements to determine that the sensor carrier structure (220) should be repositioned and/or where the sensor carrier structure (220) should be repositioned, the internal computing system (110) (or any other device) can also use other relevant information. For example, the internal computing system (110) (or any other device) can also consider conditions associated with the autonomous vehicle (102), an operation or behavior of the autonomous vehicle (102), a state and/or condition of the sensors on the sensor carrier structure (220), and/or any other events or data relevant to determining whether the sensors should be repositioned to clean them, to obtain better visibility or accuracy, to protect them from a hazard, to adjust their FOV, etc.

At step 1006, the method 1000 can include sending, to the motor (212) of the actuator system (204) and based on the one or more instructions, one or more control signals configured to control the motor (212) to reposition the sensor carrier structure (220) to the different position. For example, in some cases, to generate the one or more control signals, the motor controller (206) can translate the one or more instructions into a format and power level that can move the motor (212) to the different position. The motor controller (206) can then send (e.g., transmit, provide, apply, etc.) the control signal(s) to the motor (212) in order to trigger the motor (212) to move to the different position.

At step 1008, the method 1000 can include moving, by the motor (212) and in response to the one or more control signals, a belt (230) mechanically engaged with one or more pulleys (226, 228, 328) to drive a first rotational movement of at least one of the one or more pulleys (226, 228, 328) to cause a second rotational movement of the sensor carrier structure (220) to the different position. In some examples, the one or more control signals can include a series of voltages that can be applied to the motor (212) to make the motor (212) spin to rotate a motor pulley (226). The rotation of the motor pulley (226) may cause a belt (230) engaged to the motor pulley (226), a tension pulley (228), and an idler pulley (328) to rotate a timing pulley drive ring (232). The rotation of the timing pulley drive ring (232), to which the sensor carrier structure (220) is mounted, causes the sensor carrier structure (220) to move to the different position. The motor (212) can receive the one or more control signals from the motor controller (206) and use the one or more control signals to rotate the motor pulley 226 and, hence, the belt (230) and timing pulley drive ring (232) to move the sensor carrier structure (220) containing the sensors (104-108) in order to move or reposition the sensors (104-108) to the different position.

In some aspects, the actuator system (204) can include an actuator brake (208) configured to stop or lock a rotor associated with the motor (212) of the actuator system (204). Moreover, in some cases, the sensor positioning platform (200) can include a chassis (236) that is coupled to the sensor carrier structure (220). The chassis (236) can include the actuator system (204), as well as one or more other components such as, for example and without limitation, a surround view camera, a temperature sensor, a power supply, one or more processors, the helical service loop (234), etc.

Moreover, in some examples, the motor (212) can be configured to move and reposition the sensor carrier structure (220) and the sensors (104-108) on the sensor carrier structure (220) during an operation of the autonomous vehicle (102), such as during a driving or navigating operation. The sensors (104-108) can be configured to gather sensor data before the sensor carrier structure (220) is moved and repositioned, as the sensor carrier structure (220) is moved and repositioned, and/or after the sensor carrier structure (220) is moved and repositioned. This can allow the sensors (104-108) to obtain sensor data from different positions (e.g., different angles, locations, etc.) and expand or target their visibility or FOV.

As described herein, one aspect of the present technology includes gathering and using data available from various sources to improve quality and experience. The present disclosure contemplates that in some instances, this gathered data may include personal information. The present disclosure contemplates that the entities involved with such personal information respect and value privacy policies and practices.

Figure 11:
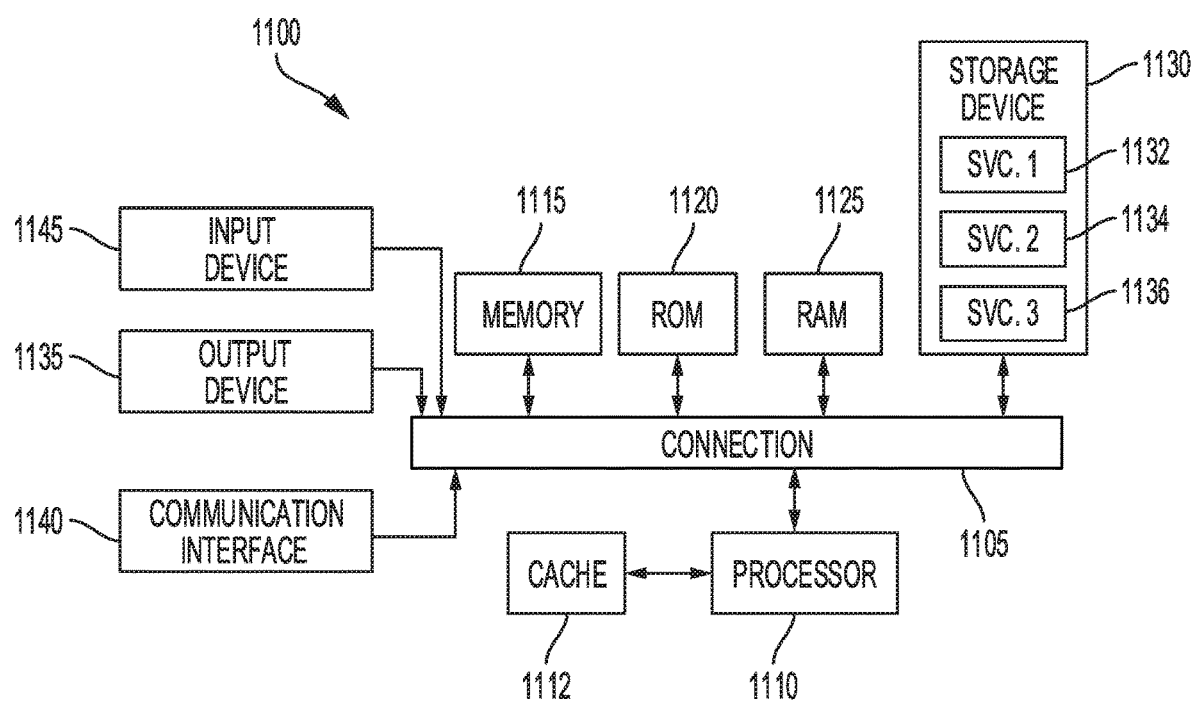
FIG. 11 illustrates an example computing system architecture for implementing various aspects of the present technology.

FIG. 11 illustrates an example computing system 1100 which can be, for example, any computing device making up internal computing system 110, remote computing system 150, a passenger device executing rideshare application 170, or any other computing device. In FIG. 11, the components of the computing system 1100 are in communication with each other using connection 1105. Connection 1105 can be a physical connection via a bus, or a direct connection into processor 1110, such as in a chipset architecture. Connection 1105 can also be a virtual connection, networked connection, or logical connection.

In some embodiments, computing system 1100 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1100 includes at least one processing unit (CPU or processor) 1110 and connection 1105 that couples various system components including system memory 1115, such as read-only memory (ROM) 1120 and random access memory (RAM) 1125 to processor 1110. Computing system 1100 can include a cache of high-speed memory 1112 connected directly with, in close proximity to, or integrated as part of processor 1110.

Processor 1110 can include any general purpose processor and a hardware service or software service, such as services 1132, 1134, and 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms known to those of skill in the art. In some instances, multimodal systems can enable a user to provide multiple types of input/output to communicate with computing system 1100. Computing system 1100 can include communications interface 1140, which can generally govern and manage the user input and system output. There is no restriction on operating on any particular hardware arrangement, and therefore the basic features here may easily be substituted for improved hardware or firmware arrangements as they are developed.

Storage device 1130 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1130 can include software services, servers, services, etc., that when the code that defines such software is executed by the processor 1110, it causes the system to perform a function. In some embodiments, a hardware service that performs a particular function can include the software component stored in a computer-readable medium in connection with the necessary hardware components, such as processor 1110, connection 1105, output device 1135, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A sensor positioning platform on an autonomous vehicle, the sensor positioning platform comprising:
    an actuator system configured to move and reposition a sensor carrier structure comprising a plurality of sensors, the actuator system comprising:
        a motor; and
        a belt mechanically engaged with one or more pulleys such that operation of the motor results in the belt driving a first rotational movement of at least one of the one or more pulleys, wherein the first rotational movement of the at least one of the one or more pulleys causes a second rotational movement of the sensor carrier structure;
    a motor controller configured to:
        receive one or more instructions for controlling the motor to reposition the sensor carrier structure from a current position to a different position; and
        based on the one or more instructions, send, to the motor, one or more control signals configured to control the motor to reposition, via movement of the belt resulting in the first rotational movement, the sensor carrier structure to the different position; and
    a helical service loop comprising a set of cables coiled within a central bore of the actuator system, wherein the set of cables comprises one or more tubes configured to transport liquid and gasses to allow for cleaning of the plurality of sensors and one or more electrical wires to provide power to the plurality of sensors and transmit data to and from the plurality of sensors.

2. The sensor positioning platform of claim 1, wherein the actuator system further comprises a tension arm that is mechanically engaged with the belt to maintain tension on the belt during the operation of the motor.

3. The sensor positioning platform of claim 1, wherein the plurality of sensors comprises at least one of an image sensor, a light detection and ranging (LIDAR) sensor, a radio detection and ranging (RADAR) sensor, and a motion detector sensor.

4. The sensor positioning platform of claim 1, wherein the motor includes a planetary gearhead to increase rotational resolution of the plurality of sensors during the operation of the motor.

5. The sensor positioning platform of claim 1, wherein the actuator system further comprises an encoder mounted on to the motor to control the first rotational movement.

6. The sensor positioning platform of claim 1, further comprising a grip mounted on to a pulley of the one or more pulleys to removably engage the helical service loop in order to allow for rotational movement of the helical service loop in conjunction with the first rotational movement.

7. The sensor positioning platform of claim 1, wherein the motor is coupled to an electric brake that multiplies a brake torque of the actuator system resulting from the first rotational movement.

8. The sensor positioning platform of claim 1, wherein the motor is configured to move and reposition the sensor carrier structure and the plurality of sensors on the sensor carrier structure during an operation of the autonomous vehicle.

9. The sensor positioning platform of claim 1, wherein the sensor carrier structure comprises an encoder to control the second rotational movement.

10. The sensor positioning platform of claim 1, wherein the actuator system comprises a position sensor configured to sense the current position of the sensor carrier structure and report the current position of the sensor carrier structure to the motor controller, and wherein a requested position is calculated based on the current position sensed by the position sensor.

11. An autonomous vehicle comprising:
a mechanical system;
an internal computing system;
an actuator system in communication with the internal computing system and configured to move a sensor carrier structure comprising a plurality of sensors, wherein the actuator system comprises:
a motor; and
a belt mechanically engaged with one or more pulleys such that operation of the motor results in the belt driving a first rotational movement of at least one of the one or more pulleys, wherein the first rotational movement of the at least one of the one or more pulleys causes a second rotational movement of the sensor carrier structure;
a motor controller configured to:
receive, from the internal computing system, one or more instructions for controlling the motor of the actuator system to reposition the sensor carrier structure from a current position to a different position; and
based on the one or more instructions, send, to the motor of the actuator system, one or more control signals configured to control the motor to reposition the sensor carrier structure to the different position; and
a bundle of cables coiled within a central bore of the actuator system, wherein the bundle of cables comprises one or more tubes configured to transport liquid and gasses to allow for cleaning of the plurality of sensors and one or more electrical wires to provide power to the plurality of sensors and transmit data to and from the plurality of sensors.

12. The autonomous vehicle of claim 11, wherein the plurality of sensors comprises at least one of an image sensor, a light detection and ranging (LIDAR) sensor, a radio detection and ranging (RADAR) sensor, and a motion detector sensor.

13. The autonomous vehicle of claim 11, wherein the actuator system further comprises an encoder mounted on to a motor shaft of the motor to control the first rotational movement.

14. The autonomous vehicle of claim 11, wherein the sensor carrier structure comprises an encoder mounted on to a sensor stage to control the second rotational movement.

15. The autonomous vehicle of claim 11, wherein the actuator system further comprises a tension arm mechanically engaged with the belt to maintain tension on the belt during the operation of the motor.

16. The autonomous vehicle of claim 11, wherein the bundle of cables are positioned in a helical arrangement within the central bore of the actuator system.

17. The autonomous vehicle of claim 11, wherein the motor includes a planetary gearhead to increase rotational resolution of the plurality of sensors during the operation of the motor.

18. A method comprising:
determining, based on one or more measurements from a position sensor on an actuator system of a sensor positioning platform coupled to an autonomous vehicle, a current position of a motor associated with the actuator system, wherein the actuator system comprises a bundle of cables coiled within a central bore of the actuator system, wherein the bundle of cables comprises one or more tubes configured to transport liquid and gasses to allow for cleaning of a plurality of sensors and one or more electrical wires to provide power to the plurality of sensors and transmit data to and from the plurality of sensors;
receiving, by a motor controller, one or more instructions for controlling the motor of the actuator system to reposition a sensor carrier structure on the sensor positioning platform from the current position to a different position calculated based on the one or more measurements, the sensor carrier structure comprising the plurality of sensors;
based on the one or more instructions, sending, to the motor of the actuator system, one or more control signals configured to control the motor to reposition the sensor carrier structure to the different position; and
in response to the one or more control signals, moving, by the motor, a belt mechanically engaged with one or more pulleys to drive a first rotational movement of at least one of the one or more pulleys, wherein the first rotational movement causes a second rotational movement of the sensor carrier structure to the different position.

19. The method of claim 18, wherein:
the actuator system comprises an encoder mounted on to the motor; and
the one or more control signals are further configured to cause the encoder to modulate a velocity of a motor shaft of the motor to allow for the first rotational movement in accordance with the one or more instructions.

20. The method of claim 18, wherein the actuator system comprises a tension arm that is mechanically engaged with the belt to maintain tension on the belt during operation of the motor.

* * * * *